United States Patent
Cha et al.

(10) Patent No.: US 10,356,070 B2
(45) Date of Patent: Jul. 16, 2019

(54) METHOD FOR TRANSFERRING PROFILE AND ELECTRONIC DEVICE SUPPORTING THE SAME

(71) Applicant: Samsung Electronics Co., Ltd., Gyeonggi-do (KR)

(72) Inventors: Soon Hyun Cha, Gyeonggi-do (KR); Sun Min Hwang, Gyeonggi-do (KR); Sang Soo Lee, Gyeonggi-do (KR); Tae Sun Yeoum, Seoul (KR)

(73) Assignee: Samsung Electronics Co., Ltd. (KR)

( * ) Notice: Subject to any disclaimer, the term of this patent is extended or adjusted under 35 U.S.C. 154(b) by 196 days.

(21) Appl. No.: 15/046,124

(22) Filed: Feb. 17, 2016

(65) Prior Publication Data
US 2016/0241537 A1  Aug. 18, 2016

(30) Foreign Application Priority Data
Feb. 17, 2015 (KR) .................. 10-2015-0024465

(51) Int. Cl.
| H04L 29/06 | (2006.01) |
| G06F 21/31 | (2013.01) |
| G06F 21/44 | (2013.01) |
| H04W 12/04 | (2009.01) |
| H04W 12/06 | (2009.01) |

(52) U.S. Cl.
CPC .............. *H04L 63/08* (2013.01); *G06F 21/31* (2013.01); *G06F 21/44* (2013.01); *H04L 63/102* (2013.01); *H04W 12/04* (2013.01); *H04W 12/06* (2013.01)

(58) Field of Classification Search
CPC ...... H04L 63/08; H04L 63/102; H04W 12/04; H04W 12/06; G06F 21/31; G06F 21/44
See application file for complete search history.

(56) References Cited

U.S. PATENT DOCUMENTS

| 2006/0224675 | A1* | 10/2006 | Fox | .................. | G06Q 10/00 709/206 |
| 2009/0193329 | A1* | 7/2009 | Oh | .................. | G06F 17/30699 715/234 |
| 2012/0158847 | A1* | 6/2012 | Bertin | ................. | H04L 63/0492 709/204 |
| 2012/0270602 | A1* | 10/2012 | Card | .................. | G06F 13/4291 455/558 |
| 2013/0283047 | A1* | 10/2013 | Merrien | ................ | H04W 12/08 713/164 |
| 2014/0364118 | A1* | 12/2014 | Belghoul | ............. | H04W 4/003 455/435.1 |

(Continued)

Primary Examiner — Joseph P Hirl
Assistant Examiner — J. Brant Murphy
(74) Attorney, Agent, or Firm — The Farrell Law Firm, P.C.

(57) ABSTRACT

A method of transferring a profile by an electronic device and an electronic device supporting the same are provided. The electronic device includes a secure memory that installs and deletes at least one profile, a profile manager module that performs an authentication procedure about a target electronic device based on device information of the target electronic device and profile information of a target profile, when a profile transfer event about a target profile of the at least one profile installed on the secure memory occurs, and a communication interface that transfers the target profile based on an authentication result about the target electronic device.

10 Claims, 15 Drawing Sheets

(56) References Cited

U.S. PATENT DOCUMENTS

| | | | |
|---|---|---|---|
| 2015/0248365 A1* | 9/2015 | Cheng | G06F 13/409 710/301 |
| 2015/0281957 A1* | 10/2015 | Hartel | H04M 1/675 455/411 |
| 2015/0327207 A1* | 11/2015 | Bharadwaj | H04W 8/04 455/435.2 |
| 2016/0212617 A1* | 7/2016 | Koshimizu | H04L 9/0844 |

* cited by examiner

METHOD FOR TRANSFERRING PROFILE AND ELECTRONIC DEVICE SUPPORTING THE SAME

PRIORITY

This application claims priority under 35 U.S.C. § 119(a) to a Korean Patent Application filed on Feb. 17, 2015, in the Korean Intellectual Property Office and assigned Serial No. 10-2015-0024465, the entire content of which is incorporated herein by reference.

BACKGROUND

1. Field of Disclosure

The present disclosure relates to a technique for transferring a profile.

2. Description of the Related Art

Unlike conventional removable cards, such as a subscriber identifier module (SIM) card, a universal subscriber identifier module (USIM) card, and a universal IC card (UICC), an embedded universal IC card (eUICC) or an embedded subscriber identifier module (eSIM) is mounted in an electronic device in the form of a chip when the electronic device is manufactured, and thus the eUICC or eSIM may not be removed by a user. The eUICC or the eSIM may download a profile in an over the air (OTA) manner to allow a user to change an operator. One eUICC or eSIM is capable of supporting a plurality of profiles.

Like the conventional removable SIM card, the eUICC is capable of transferring a profile, which is currently used on an electronic device, to another electronic device. To transfer a profile, a target electronic device to which the profile is to be transferred must be previously connected to a server, which transfers the profile, through Wi-Fi or a cellular network. Accordingly, a method for transferring a profile between electronic devices safely and conveniently is required.

SUMMARY

The present disclosure has been made to address at least the above-mentioned problems and/or disadvantages and to provide at least the advantages described below.

Accordingly, an aspect of the present disclosure is to provide a method for transferring a profile of an electronic device and an electronic device supporting the same.

In accordance with an aspect of the present disclosure, an electronic device is provided. The electronic device includes a secure memory that installs and deletes at least one profile, a profile manager module that performs an authentication procedure about a target electronic device based on device information of the target electronic device and profile information of a target profile, when a profile transfer event about a target profile of the at least one profile installed on the secure memory occurs, and a communication interface that transfers the target profile based on an authentication result about the target electronic device.

In accordance with another aspect of the present disclosure, a second electronic device is provided. The second electronic device includes a secure memory that installs and deletes at least one profile, a communication interface that transfers device information to a first electronic device and receives a profile, and a profile manager module that stores the received profile in a secure area, and when the profile is deleted from the first electronic device, installs the profile in the secure memory.

In accordance with another aspect of the present disclosure, a method for transferring a profile is provided. The method includes detecting an occurrence of a profile transfer event about a profile installed on a secure memory of a first electronic device, receiving device information from a second electronic device corresponding to a target of the profile transfer event, performing an authentication procedure about the second electronic device based on the device information and profile information, and transferring the profile to the second electronic device based on an authentication result about the second electronic device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
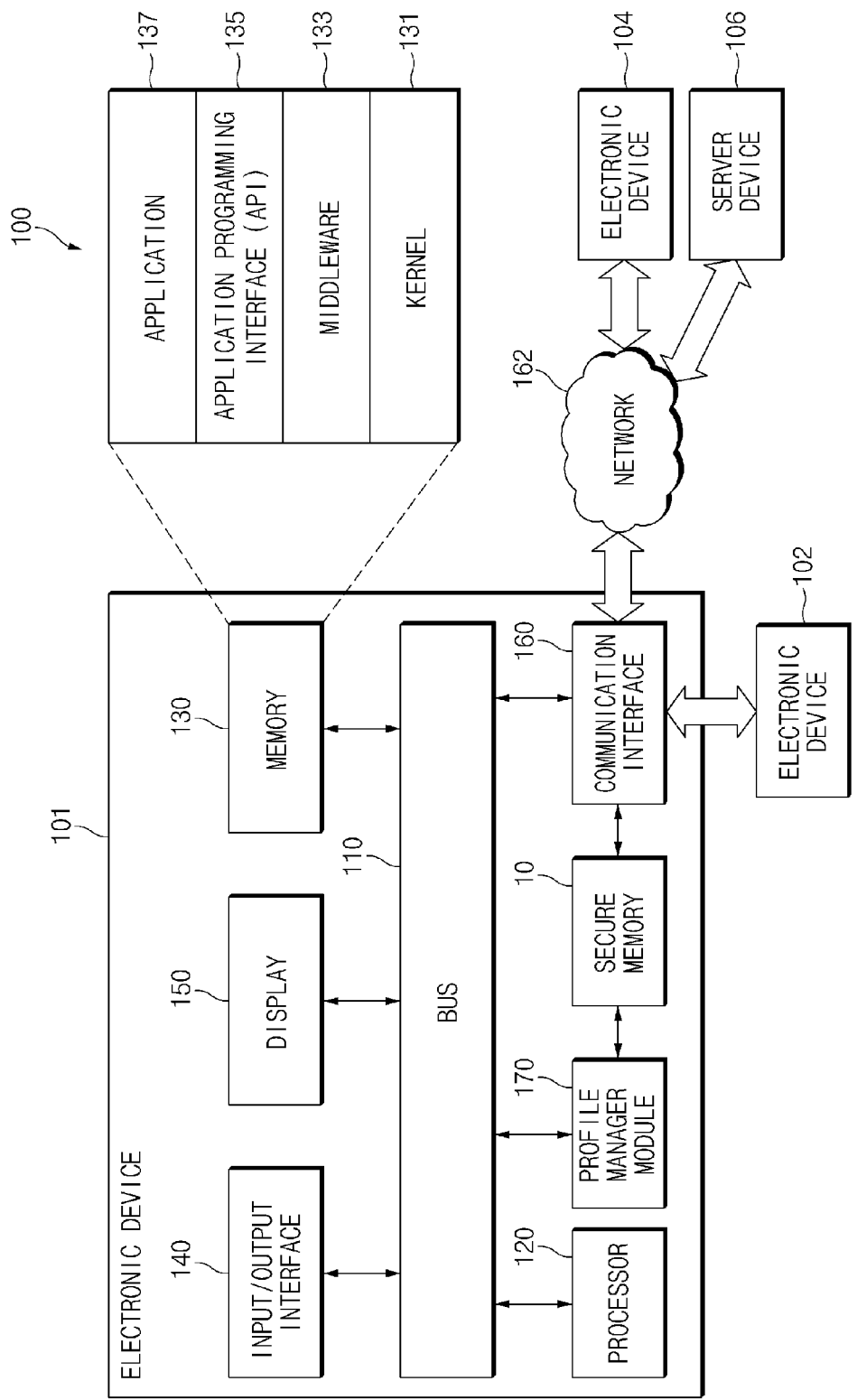
FIG. 1 is a block diagram of an electronic device, according to an embodiment of the present disclosure.

Various embodiments of the present disclosure may be described with reference to the accompanying drawings throughout which like reference numbers may be used to depict the same or similar elements, features, and structures. Accordingly, those of ordinary skill in the art will recognize that various modifications on the various embodiments described herein can be variously made without departing from the scope and spirit of the present disclosure. As used herein, the expressions "have", "may have", "include" and "comprise" indicate existence of corresponding features (e.g., elements such as numeric values, functions, operations, or components) but do not exclude the presence of additional features.

As used herein, the expressions "A or B", "at least one of A or/and B", or "one or more of A or/and B", etc. may include any and all combinations of one or more of the associated listed items. For example, the terms "A or B", "at least one of A and B", or "at least one of A or B" may refer to all of the case (1) where A is included, the case (2) where B is included, or the case (3) where both A and B are included.

Terms, such as "first", "second", etc. used herein may refer to various elements of embodiments of the present disclosure, but do not limit the elements. For example, such terms do not limit the order and/or priority of the elements. Furthermore, such terms may be used to distinguish one element from another element. For example, without departing the scope of the present disclosure, a first element may be referred to as a second element, and similarly, a second element may be referred to as a first element.

It should be understood that when an element (e.g., a first element) is referred to as being (operatively or communicatively) "coupled with/to" or "connected to" another element (e.g., a second element), it can be directly coupled with/to or connected to the second element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element) between the first element and the second element.

According to the situation, the expression "configured to" used herein may be used interchangeably with the expression "suitable for", "having the capacity to", "designed to", "adapted to", "made to", or "capable of". The term "configured to" should not be interpreted to mean only "specifically designed to" in hardware. Instead, the expression "a device configured to" may mean that the device is "capable of" operating together with another device or other components. For example, a "processor configured to perform A, B, and C" may refer to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this specification are used to describe specific embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein. In some cases, even terms defined in the specification, should not be interpreted to exclude embodiments of the present disclosure.

Hereinafter, electronic devices according to an embodiment of the present disclosure will be described with reference to the accompanying drawings. The term "user" used herein may refer to a person who uses an electronic device or may refer to a device (e.g., an artificial intelligence electronic device) that uses an electronic device.

FIG. 1 is a block diagram of an electronic device, according to an embodiment of the present disclosure.

Referring to FIG. 1, an electronic device 101 in a network environment 100, according to an embodiment of the present disclosure, is provided. The electronic device 101 includes a secure memory 10, a bus 110, a processor 120, a memory 130, an input/output (I/O) interface 140, a display 150, a communication interface 160, and a profile manager module 170. The electronic device 101 may exclude at least one of the above-described components or may further include one or more other components.

According to an embodiment of the present disclosure, the electronic device 101 transfers a profile installed on the secure memory 10 to another electronic device, such as a first external electronic device 102 or a second external electronic device 104. A profile to be transferred to the first external electronic device 102 or the second external electronic device 104 is referred to as "target profile", and the first external electronic device 102 or the second external electronic device 104 receiving the target profile is referred to as "target electronic device". The target device may include similar components as the electronic device 101.

The secure memory 10 includes an independent operating system (OS) and may store and remove at least one profile. Removing a profile refers to deleting or de-provisioning of a profile. A profile (e.g., a module network operator (MNO) profile) refers to a subscriber identifier module which is able to be stored in or removed from the secure memory 10. For example, a profile corresponds to a removable SIM card. The profile includes service provider-associated information, subscriber identification information (e.g., IMSI), card identification information (e.g., ICCID), network authentication-associated information, etc.

The secure memory 10 downloads the profile in the OTA manner. The secure memory 10 may store a plurality of profiles, and the electronic device 101 may use different network services, which a plurality of operators provides, using the plurality of profiles installed on the secure memory 10. Since the secure memory 10 is mounted in the electronic device 101 in the form of a chip in manufacturing the electronic device 101, the secure memory 10 may not be removed by a user. The secure memory 10 includes an independent OS. The secure memory 10 includes various authentication information (e.g., a private key, a public key, a certificate, a keyset for updating the certificate, etc.) associated with downloading, installing, and managing the profile and may provide a secure OTA channel or network authentication algorithm. The secure memory 10 may include an eUICC, an embedded secure element (eSE), a micro secure digital (SD), a trust zone, etc. A standard platform, an internal structure, connected units, etc. of the secure memory 10 may vary according to an embodiment of the present disclosure. For example, if implemented with the eUICC, the secure memory 10 may be connected with a communication processor (CP) and in this case, a global platform according to the eUICC standard is applied to the secure memory 10. Alternatively, if implemented with the eSE, the secure memory 10 may be connected with a near field communication (NFC) module, and in this case, a global platform according to the eSE standard is applied to the secure memory 10. Alternatively, if implemented in the form of the trust zone, the secure memory 10 corresponds to a separate secure area independent of a normal area at one physical processor (or a processor core) and may include a central processing unit, a register, an address space, a memory, a device, an operating system, etc. which are separated from the normal area. However, the scope and spirit of the present disclosure is not limited thereto. For example, the secure memory 10 may include all secure areas capable of storing and deleting at least one profile.

The bus 110 interconnects the above-described components 110 to 170 and is a circuit for conveying communications (e.g., a control message and/or data) among the above-described components.

The processor 120 includes one or more of a central processing unit (CPU), an application processor (AP), or a CP. The processor 120 performs data processing or an operation associated with control or communication of at least one other component of the electronic device 101.

The memory 130 includes a volatile and/or nonvolatile memory. The memory 130 stores instructions or data associated with at least one other component of the electronic device 101. The memory 130 stores software and/or a program. The program includes, for example, a kernel 131, a middleware 133, an application programming interface (API) 135, and/or an application 137. At least a portion of the kernel 131, the middleware 133, or the API 135 may be called an "operating system (OS)".

According to an embodiment of the present disclosure, the memory 130 stores profile extended information about each of at least one or more profiles available on the electronic device 101, independently of the secure memory 10. Alternatively, the profile extended information may be stored in an internal memory of the processor 120 which generates and manages the profile extended information. The memory 130 may store the profile extended information in a secure area to prevent a user or an external device from easily accessing the profile extended information. The secure area may correspond to an area separate from the secure memory 10 which stores at least one profile.

According to an embodiment, the electronic device 101 may further include a slot for a SIM card, and the memory 130 may store the profile extended information using subscriber information included in the SIM card inserted into the SIM slot as one profile.

The kernel 131 controls or manages system resources (e.g., the bus 110, the processor 120, the memory 130, etc.) that are used to execute operations or functions of other programs (e.g., the middleware 133, the API 135, and the application 137). Furthermore, the kernel 131 may provide an interface that allows the middleware 133, the API 135, or the application 137 to access discrete components of the electronic device 101 so as to control or manage system resources.

The middleware 133 performs a mediation role such that the API 135 or the application 137 communicates with the kernel 131 to exchange data.

Furthermore, the middleware 133 processes task requests received from the applications 137 according to a priority. For example, the middleware 133 assigns the priority, which makes it possible to use a system resource (e.g., the bus 110, the processor 120, the memory 130, etc.) of the electronic device 101, to at least one of the applications 137. For example, the middleware 133 processes the task requests according to the priority assigned to the at least one of the applications 137, which makes it possible to perform scheduling or load balancing on the task requests.

The API 135 is an interface through which the application program 137 controls a function provided by the kernel 131 or the middleware 133, and includes at least one interface or function (e.g., an instruction) for file control, window control, image processing, character control, etc.

The I/O interface 140 transmits an instruction or data, input from a user or a first external electronic device 102 or a second external electronic device 104, to other components of the electronic device 101. Furthermore, the I/O interface 140 may output an instruction or data, received from other components of the electronic device 101, to a user or the first external electronic device 102 or a second external electronic device 104.

According to an embodiment of the present disclosure, the input/output interface 140 generates a profile transfer event or receives an input (e.g., a user input or the like) for designating a target profile or a target electronic device. For example, the input/output interface 140 may receive an input for selecting at least one profile installed on the secure memory 10 or an input for selecting at least one profile displayed on the display 150. Alternatively, the input/output interface 140 may generate a profile transfer event through NFC tagging with the target electronic device or may receive an input for designating the target electronic device. When transferring the target profile, the input/output interface 140 may receive a user input for user authentication. For example, the user input may include a PIN code input, an ID and PW input, a pattern input, etc.

The display 150 may include, for example, a liquid crystal display (LCD), a light-emitting diode (LED) display, an organic LED (OLED) display, a microelectromechanical systems (MEMS) display, or an electronic paper display. The display 150 displays various contents (e.g., a text, an image, a video, an icon, a symbol, etc.) to a user. The display 150 may include a touch screen and may receive a touch, gesture, proximity, or hovering input using an electronic pen or a portion of a user's body.

According to an embodiment of the present disclosure, the display 150 displays a user interface screen for generating the profile transfer event. For example, the user interface screen includes a user interface screen for selecting a profile to be transferred or a target electronic device. The display 150 displays at least one profile installed on the secure memory 10. For example, the display 150 displays at least one profile in response to an occurrence of the profile transfer event. The display 150 displays at least one electronic device to which the target profile is to be transferred. For example, the display 150 displays the first external electronic device 102 or second external electronic device 104 which is connected to the electronic device 101 or is able to communicate with the electronic device 101.

The communication interface 160 establishes communication between the electronic device 101 and the first external electronic device 102, the second external electronic device 104, or a server 106. For example, the communication interface 160 may be connected to the network 162 through wireless communication or wire communication and may communicate with the second external electronic device 104 or the server 106.

The wireless communication may include at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), etc., as a cellular communication protocol. Furthermore, the wireless communication may include, for example, a local area network. The local area network may include, for example, Wi-Fi, Bluetooth, NFC, global positioning system (GPS), etc.

The wired communication may include, for example, universal serial bus (USB), high definition multimedia interface (HDMI), recommended standard-232 (RS-232), or plain old telephone service (POTS).

The network 162 includes a telecommunications network, for example, a computer network (e.g., LAN or WAN), the Internet, or a telephone network.

The communication interface 160 performs communication (e.g., NFC, BT, Wi-Fi, etc.) with the target electronic device.

According to an embodiment of the present disclosure, in response to the occurrence of the profile transfer event, the communication interface 160 establishes connection with the target electronic device or determines a connection state. The communication interface 160 receives device information from the target electronic device or transfers the target profile (or an encrypted profile) or user data associated with the target profile to the target electronic device. For example, the communication interface 160 transmits and receives the following to and from the target electronic device through the NFC tagging: device information, a target profile, an encrypted profile, and user data (e.g., setting information associated with the target profile, app information, etc.) associated with the target profile. For example, the device information may include IMEI (international mobile equipment identity, EID (eUICC-ID), MSISDN (mobile station international subscriber directory number), etc.

According to an embodiment of the present disclosure, the communication interface 160 provides a network service to the target electronic device. For example, the target electronic device receives data associated with the target profile from the server 106 (e.g., a profile transfer server, a profile authentication server, a profile management server (e.g., a subscription manager-secure routing (SM-SR) server), a profile generation server (e.g., a subscription manager-data preparation (SM-DP) server), a provisioning support server, a network operator server, a server of a secure memory manufacturer, etc.) using the network service of the electronic device 101. In this case, the provisioning support server may be an operator server which stores subscription information of a user of the electronic device 101. For example, the server 106 transfers a regenerated profile or a regenerated, encrypted profile to the target electronic device through a network 162 of the electronic device 101, based on profile information. For example, the profile information may include ICCID.

The communication interface 160 communicates with the server 106. For example, the communication interface 160 transfers at least one of device information of the target electronic device, profile information of the target electronic device, or authentication-associated information (e.g., a certificate) of the target electronic device. Alternatively, the communication interface 160 may receive an authentication result from the server 106.

The profile manager module 170 performs the authentication procedure about the target electronic device, based on at least one of device information of the target electronic device, profile information of the target electronic device, or authentication-associated information of the target electronic device.

According to an embodiment of the present disclosure, the profile manager module 170 transmits an authentication request to the server 106 through the communication interface 160 together with the device information, the profile information, or the authentication-associated information and receives an authentication result from the server 106. For example, the server 106 authenticates whether to allow a transfer of the target profile to the target electronic device. When the profile transfer event occurs, the profile manager module 170 performs the authentication procedure about the target electronic device based on the device information and the profile information.

According to an embodiment of the present disclosure, regardless of occurrence of the profile transfer event, the profile manager module 170 may receive an input for designating the target electronic device in advance and perform the authentication procedure about the target electronic device. The profile manager module 170 performs the authentication procedure in such a way that it is determined whether the target electronic device associated with the profile transfer event corresponds to a previously authenticated electronic device. For example, the profile manager module 170 may independently perform authentication without the server 106. That is, the profile manager module 170 may store authentication policy information for device authentication in advance and may authenticate the target electronic device using at least one of the device information (e.g., a unique identifier (e.g., IMEI, EID, etc.), a manufacturer, the data of manufacture, a model name, feature information (e.g., whether a processor includes a secure area (e.g., a secure trust zone), whether the secure memory 10 exists, etc.) of the target electronic device included in the authentication policy information. For example, if the profile manager module 170 stores an authentication policy which includes information indicating that the target electronic device (e.g., a Samsung Galaxy Tab' model) includes a trust zone of a specific kind, the profile manager module 170 determines a manufacturer, a model name, and feature information (e.g., whether a trust zone is included) of the target electronic device and authenticates the target electronic device.

When the authentication is completed, the profile manager module 170 encrypts the target profile and transfers the encrypted profile to the target electronic device or the server 106 through the communication interface 160. Alternatively, the profile manager module 170 may previously store the encrypted profile in the secure area of the electronic device 101. For example, the profile manager module 170 may store an encrypted profile received from a profile creation server in a secure area upon installing of the profile. In this case, when the profile transfer event occurs, the profile manager module 170 transfers the encrypted profile stored in the secure area to the target electronic device or the server 106 without encryption of the profile installed on the secure memory 10. If the target electronic device of the profile is designated through the input/output interface 140, the profile manager module 170 may encrypt a corresponding profile in advance and may store the encrypted profile in the secure area.

When authentication is completed, the profile manager module 170 establishes a secure channel between the electronic device 101 and the target electronic device through the communication interface 160. For example, a bearer independent protocol (BIP) session may be formed in a peer-to-pear fashion between the secure memory 10 of the electronic device 101 on which the target profile is installed and a secure memory of the target electronic device on which the target profile is to be installed, and thus direct communication may be performed between the secure memory 10 of the electronic device 101 and the secure memory of the target electronic device without intervention of the electronic device 101 and any other component of the target electronic device. As described above, when establishing the secure channel, the profile manager module 170 establishes the secure channel with reference to feature information (e.g., a secure channel protocol available to establish the secure channel, an encryption algorithm, and the like) associated with the security of the target electronic device. The electronic device 101 may receive security-associated feature information included in the device information upon authenticating of the target electronic device or may separately request the security-associated feature information from the target electronic device upon authenticating the target electronic device. For example, when authenticating the target electronic device, the electronic device 101 is provided with a communication protocol or an encryption algorithm that the target electronic device supports. If the authentication result indicates that the transferring of the profile to the target electronic device is allowed, the electronic device 101 encrypts the target profile using the encryption algorithm that the target electronic device supports or establishes the secure channel for transferring the target profile using the communication protocol that the target electronic device supports.

The profile manager module 170 may require user authentication finally upon transferring of the target profile. For example, the user authentication may be performed through a PIN code input, an ID and PW input, a pattern input, biometrics (e.g., face recognition, finger recognition, iris recognition, and the like).

If both the target profile and user data associated with the target profile are received by the target electronic device, the profile manager module 170 removes the target profile installed on the secure memory 10. For example, the profile manager module 170 may request the deletion of the target profile from the server 106. Alternatively, the profile manager module 170 may directly delete the target profile and may report the deletion result to the server 106. Alternatively, the profile manager module 170 may directly delete the target profile and transmit the deletion report to the target electronic device, and the target electronic device may report the deletion result to the server 106. Thus, when the target profile and user data associated with the target profile are received at the target electronic device and the target profile is removed from the secure memory 10 of the first electronic device 101, the target electronic device newly installs the received target profile on the secure memory 10 of the target electronic device and enables the installed profile in the target electronic device. When a state of a corresponding profile is updated, the deletion result, together with the updating of a profile state, may be reported to the server 106.

Additionally, the profile manager module 170 may install a profile, downloaded through the communication interface 160, in the secure memory 10. In this case, the profile manager module 170 deletes the profile installed on the secure memory 10 or manages a profile state (active or inactive).

Furthermore, the profile manager module 170 may switch from a profile being currently used, to one of a plurality of profiles included in the secure memory 10.

According to an embodiment of the present disclosure, each of the electronic devices 102 and 104 may be a device of which the type is different from or the same as that of the electronic device 101. The server 106 may include a group of one or more servers. Additionally, all or a part of operations that the electronic device 101 may perform may be executed by one or more external electronic devices, such as the first external electronic devices 102, the second external electronic device' 104, and the server 106. One of the electronic devices 102 and 104 may be the target electronic device.

When the profile transfer event occurs, the target electronic device transfers device information to the electronic device 101. For example, when the target electronic device receives a request about device information from the electronic device 101, the target electronic device transfers the device information to the electronic device 101 in response to the request. When the authentication about the target electronic device is completed, the target electronic device receives an authentication result or a message, which is generated according to the authentication result, from the server 106 or the electronic device 101. For example, the target electronic device receives a message, directing the generation of a storage space (e.g., ISD-P) for storing the target profile, and/or a key value applied to the storage space, from the server 106 The target electronic device creates a storage space in response to the received message. The key value may be received from the server 106 or may be generated on the target electronic device in conjunction with the server 106 (i.e., key agreement).

If an encrypted target profile is transferred to the target electronic device, the target electronic device may not install the encrypted target profile until it is determined that a target profile in the electronic device 101 is deleted from the secure memory 10 thereof. For example, the target electronic device may store the encrypted target profile in the secure memory 10 or a separate secure area just as it is. When it is determined that a corresponding profile is deleted from the electronic device 101, the target electronic device decrypts the encrypted profile and installs the decrypted profile on the secure memory 10 of the target electronic device. The target electronic device may register at a network service using the installed profile and may update a profile state at the server 106.

According to an embodiment of the present disclosure, the electronic device 101 may not delete an encrypted profile which is stored in the secure memory 10 or a separate secure area therein, and instead, may keep and manage the encrypted profile stored therein for use in a later profile transfer event.

According to an embodiment, in the case where the electronic device 101 executes any function or service automatically or in response to a request, the electronic device 101 may not perform the function or the service internally, but may additionally request at least a portion of a function associated with the electronic device 101 from another device, such as the first external electronic device 102, the second external electronic device 104, or the server 106. In this case, the first external electronic device 102, the second external electronic device 104, or the server 106 executes the requested function or additional function and transmits the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
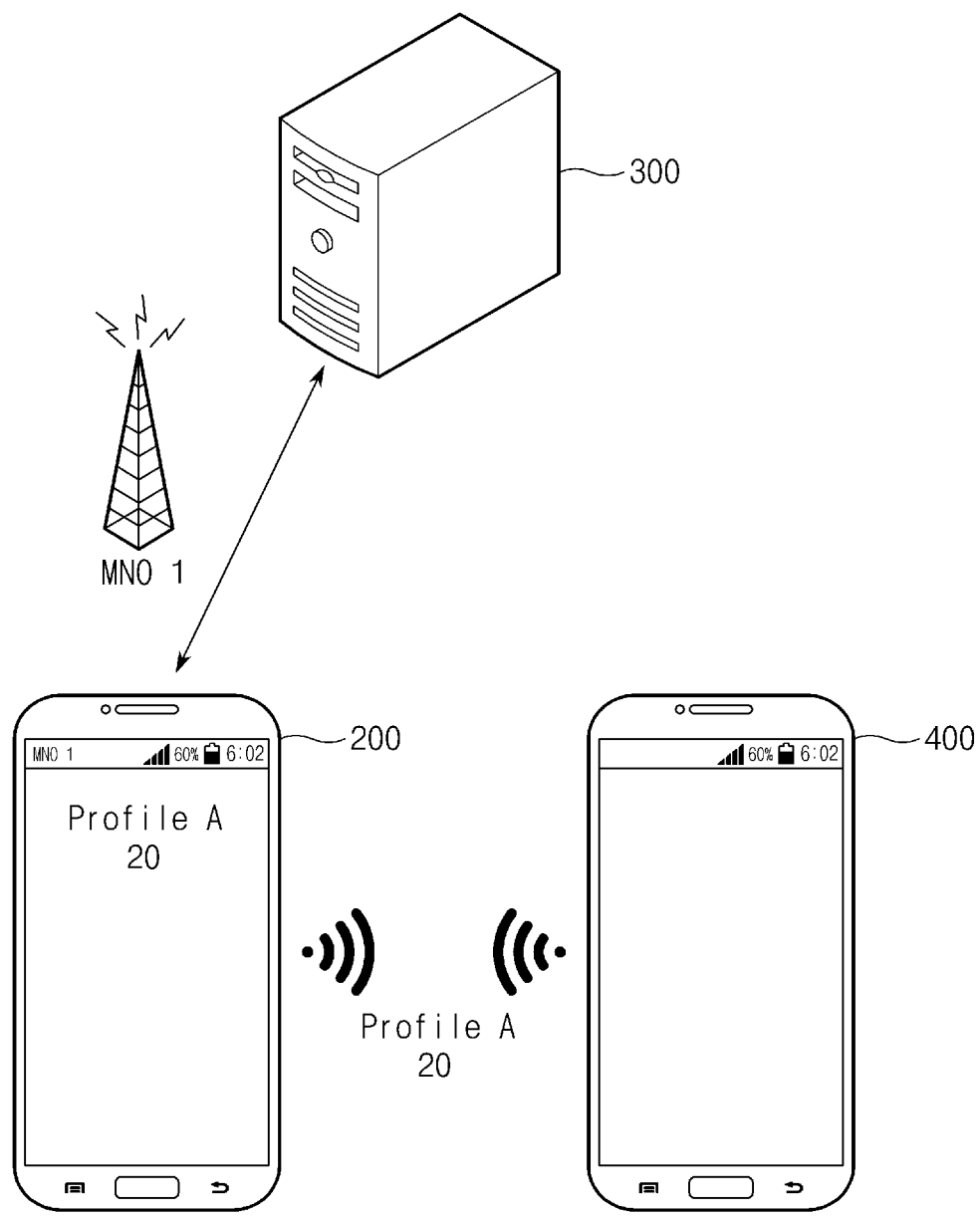
FIG. 2 illustrates a method for directly transferring a profile from a first electronic device to a second electronic device, according to an embodiment of the present disclosure.

FIG. 2 illustrates a method for directly transferring a profile from a first electronic device to a second electronic device, according to an embodiment of the present disclosure.

Referring to FIG. 2, a profile A 20 to be transferred from a first electronic device 200 to a second electronic device 400 (i.e., the target electronic device) may be active or inactive. For example, a profile transfer event about a profile A 20 may occur while a network service is provided using the profile A 20 at the first electronic device 200. That is, a profile transfer event may occur with respect to a profile which is activated. Alternatively, the profile transfer event may occur with respect to another profile, such as a profile D which is not activated.

According to an embodiment of the present disclosure, when the profile transfer event occurs, the profile manager module 170 of the first electronic device 200 displays a profile list including at least one profile installed on the secure memory 10 of the first electronic device 200, through the display 150 of the first electronic device 200. The profile manager module 170 of the first electronic device 200 may receive an input, through the input/output interface of the first electronic device 200, for selecting a target profile, such as Profile A 20, to be transferred to the second electronic device 400.

If a target profile to be transferred to the second electronic device 400 is selected, such as Profile A 20, the profile manager module 170 of the first electronic device 200 requests device information used to authenticate the second electronic device 400. For example, the device information may include IMEI, EID (a secure memory ID value), etc. The profile manager module 170 of the first electronic device 200 may request device information from the second electronic device 400 using a local area network, such as NFC and receives device information from the second electronic device 400.

Afterwards, the profile manager module 170 of the first electronic device 200 transfers the device information received for authentication of the second electronic device 400 and ICCID (e.g., information of a profile to be transferred) of the first electronic device 200 to a server 300. The server 300 performs authentication about the received profile A 20. For example, the server 300 includes at least a portion of functions of a profile transfer server, a profile authentication server, a profile manager server (e.g., an SM-SR server, etc.), a profile generation server (e.g., an SM-DP server, etc.), a provisioning support server, etc.

When the authentication is completed at the server 300, the server 300 transmits an authentication result to the first electronic device 200. If authentication about the second electronic device 400 is allowed by the server 300, the first electronic device 200 encrypts the profile A 20 to be transferred and transfers the encrypted profile A 20 to the second electronic device 400.

Accordingly, the first electronic device 200 may encrypt and transfer profile A 20 upon occurrence of the profile transfer event or, alternatively, may transfer an encrypted profile A 20, which is previously stored, upon installation of profile A 20, in the secure memory 10 of the first electronic device 200.

The profile manager module 170 encrypts or decrypts a target profile using a symmetric-key method or an asymmetric-key method.

The symmetric-key method refers to a method in which the first electronic device 200 and the second electronic device 400 use the same key for encryption and decryption. For example, the same key is generated using the same key agreement algorithm at the first electronic device 200 and the second electronic device 400, respectively. Alternatively, the first electronic device 200 and the second electronic device 400 may generate the same key based on the same key or a value (e.g., a shared secret), which is used to generate the same key, received from the server 300 and encrypts or decrypts a target profile using the key thus generated.

The asymmetric-key method refers to a method in which the first electronic device 200 and the second electronic device 400 use different keys for encryption and decryption. For example, if the first electronic device 200 encrypts a target profile through a public key of the second electronic device 400 and transfers the encrypted profile to the second electronic device 400, the second electronic device 400 decrypts the encrypted profile through a private key of the second electronic device 400. For example, the first electronic device 200 may request a public key from the second electronic device 400 and receives the public key from the second electronic device 400 in response to the request. Alternatively, the first electronic device 200 may receive a public key of the second electronic device 400 from the server 300. In this case, when authentication about the second electronic device 400 is completed, the server 300 transfers a public key of the second electronic device 400 to the first electronic device 200 together with an authentication result. The first electronic device 200 receives information about the public key together with device information of the second electronic device 400 upon authentication of the second electronic device 400 or may separately request information about the public key from the target electronic device upon encrypting a profile. For example, in the case of the symmetrical-key method, the first electronic device 200 may request information about a key agreement algorithm of the second electronic device 400 together with the request of device information for authentication of the target electronic device from the second electronic device 400. In the case where key agreement algorithms of the first and second electronic devices 200 and 400 are different from each other, the first electronic device 200 allows the server 300 to transfer a value, which is used to generate a key, to the second electronic device 400. With the above description, the first electronic device 200 and the second electronic device 400 may respectively generate the same encryption key using a generated key and perform encryption or decryption about a profile using the encryption key.

According to an embodiment of the present disclosure, the first electronic device 200 may transfer the encrypted profile A 20 using a local area network. For security, the first electronic device 200 transfers the encrypted profile A 20 through a secure channel. When authentication is completed, a secure channel may be established between the first electronic device 200 and the second electronic device 400. For example, the BIP session may be formed between a secure memory 10 of the first electronic device 200 and a secure memory 10 of the second electronic device 400 in a peer-to-peer fashion.

According to an embodiment of the present disclosure, encryption and decryption of the target profile A 20 may be performed on the secure memory 10 of the first electronic device 200 and the secure memory 10 of the second electronic device 400. For example, if a BIP session is formed between the secure memory 10 of the first electronic device 200 and the secure memory 10 of the second electronic device 400 using an advanced encryption standard (AES)-based secure channel protocol (e.g., SCP 03), the secure memory 10 of the electronic device 200 may encrypt the target profile A 20 using a SCP 03 keyset and transfers the encrypted profile A 20 to the second electronic device 400 through the formed BIP session. When receiving the encrypted profile A 20, the second electronic device 400 may decrypt the encrypted profile A 20 using the SCP 03 keyset. A profile manager module 170 or a secure memory 10 of each of the first electronic device 200 and second electronic device 400 may have the SCP 03 keyset.

According to an embodiment of the present disclosure, when the profile manager module 170 of the first electronic device 200 directly transfers an instruction or when a connection for a profile transfer is established between the first electronic device 200 and the second electronic device 400, a secure channel between the first electronic device 200 and the second electronic device 400 may be established through an application set to be executed on the first electronic device 200.

According to an embodiment of the present disclosure, the first electronic device 200 transfers user data (e.g., a call list, a character message, user settings, information of installed applications, etc.) associated with the profile A 20 together with the profile A 20. The user data may be encrypted and transferred or may, alternatively, be transferred without encryption. Furthermore, the user data may be transferred through a secure channel between the first electronic device 200 and the second electronic device 400 or may, alternatively, be transferred through an independent channel.

The second electronic device 400 stores the encrypted profile A 20, received from the first electronic device 200, in a secure memory 10 of the second electronic device 400. At this time, the profile A 20 may remain in an installed state in the first electronic device 200. When it is determined that the storing of the encrypted profile A 20 in the second electronic device 400 is completed, the first electronic device 200 may delete the profile A 20 from the secure memory 10 of the second electronic device 400. The delete of the profile A 20 may be performed by the first electronic device 200 transmitting a profile delete request to the server 300. Alternatively, after internally deleting the profile A 20, the first electronic device 200 may inform the server 300 that the profile A 20 is deleted.

When it is determined that the profile A 20 has been deleted from the first electronic device 100, the second electronic device 400 decrypts the transferred encrypted profile A 20 and installs the decrypted profile A 20 on its own secure memory 10. When the installed profile A 20 is enabled, a profile state may be updated in the server 300, and the second electronic device 400 may use a network service using the installed profile A 20.

As described, a profile may be transferred between two electronic devices. As a profile installed on one electronic device is transferred to another electronic device, the other electronic device may use a network service using the transferred profile. Accordingly, one profile may be used at a plurality of electronic devices, thereby improving the user convenience. Additionally, the profile may be transferred from one electronic device to another electronic device in a state where profile-associated data (e.g., a call list, a character message, user settings, information of installed applications, etc.) may be maintained between the two electronic devices.

Figure 3:
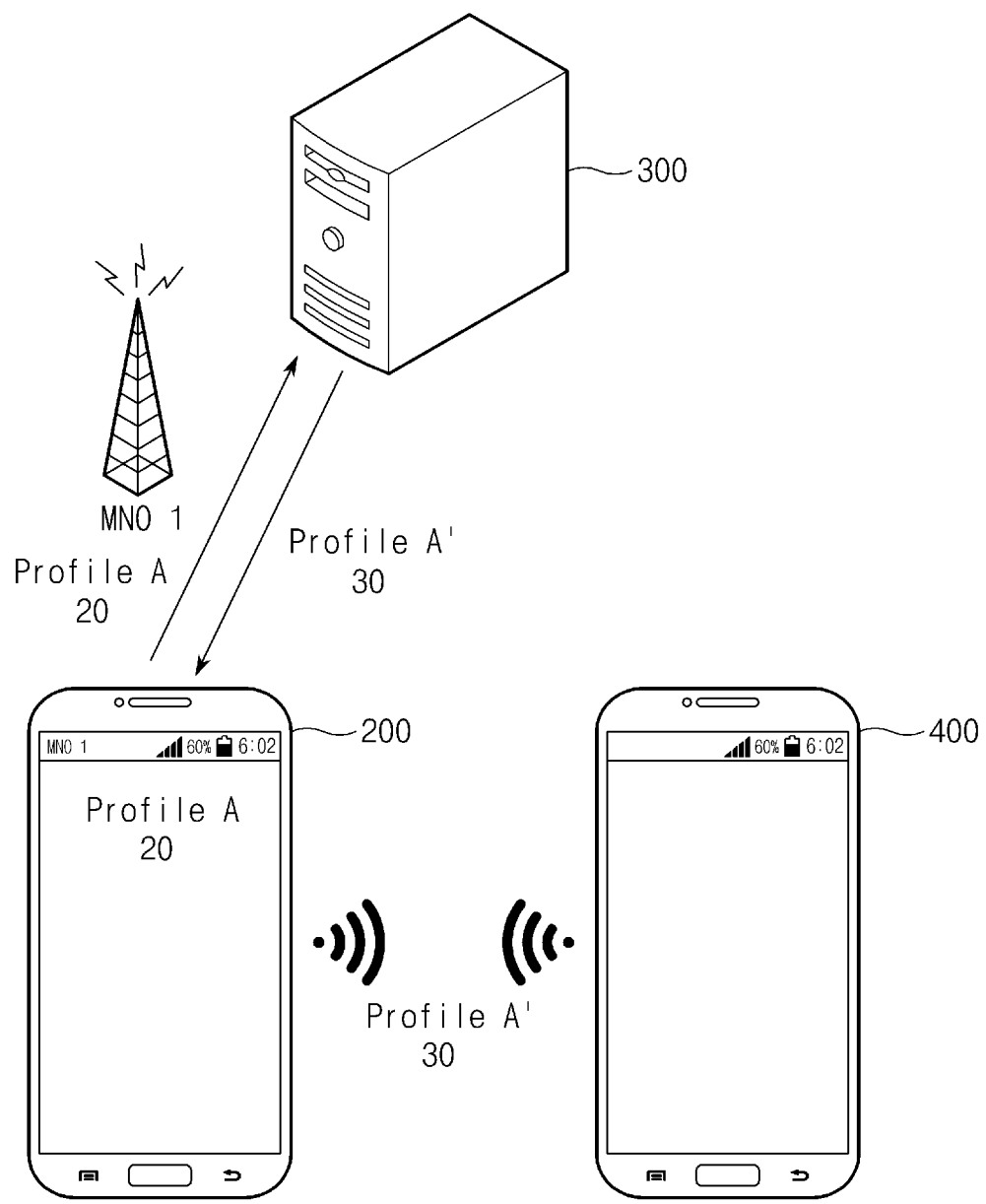
FIG. 3 illustrates a method for transferring a profile, regenerated by a server, from a first electronic device to a second electronic device, according to an embodiment of the present disclosure.

FIG. 3 illustrates a method for transferring a profile, regenerated by a server, from a first electronic device to a second electronic device, according to an embodiment of the present disclosure.

Referring to FIG. 3, a method of transferring a profile A' 30, regenerated at a server 300, to a second electronic device 400 (i.e., the target electronic device) is provided. The method associated with the occurrence of a profile transfer event is the same as that described with respect to FIG. 2, and thus a description thereof is omitted.

When authentication about the second electronic device 400 is requested, the server 300 regenerates a profile A' 30 based on received profile information and information (e.g., subscription information, credential information, etc.) associated with a corresponding profile A 20 stored in a database of the server 300. Subscription information of profile information that the profile A' 30 thus regenerated is the same as that of the profile A 20 installed on the first electronic device 200, except for credential information which is not extractable from a profile.

When the authentication is completed at the server 300, the server 300 transmits an authentication result to the first electronic device 200. If authentication about the second electronic device 400 is allowed by the server 300, the first electronic device 200 allows the second electronic device 400 to be ready to download the regenerated profile A' 30.

The first electronic device 200 transmits user data (e.g., a call list, a character message, user settings, information of installed applications, etc.) associated with the corresponding profile A 20 stored in the first electronic device 200 to the second electronic device 400, independently of the transferring of the regenerated profile A' 30 to the second electronic device 400. As shown in FIG. 3, the regenerated profile A' 30 is transferred to the second electronic device 400 through the first electronic device 200. However, the scope and spirit of the present disclosure is not to be limited thereto. For example, in the case where the second electronic device 400 is able to independently use a network, the regenerated profile A' 30 may be directly transferred to the second electronic device 400 from the server 300 through a network of the second electronic device 400.

The second electronic device 400 stores the received regenerated profile A' 30 and user data associated with the corresponding profile A 20.

The first electronic device 200 may then delete the profile A 20 and the second electronic device 400 then installs the regenerated profile A' 30 in the same manner as described with reference to FIG. 2. Accordingly, a description thereof is thus omitted.

Figure 4:
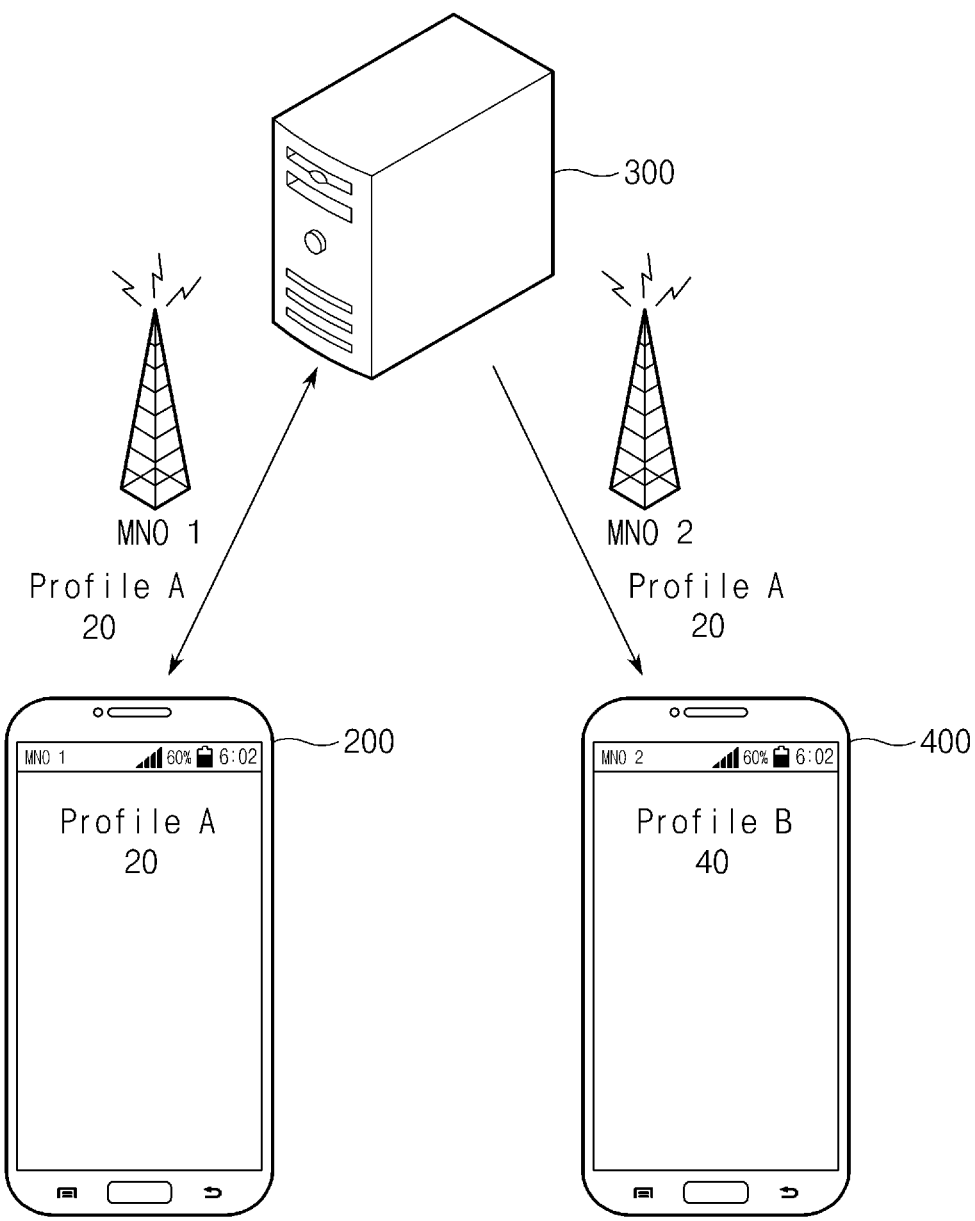
FIG. 4 illustrates a method for transferring a profile from a first electronic device to a second electronic device through a server, according to an embodiment of the present disclosure.

FIG. 4 illustrates a method for transferring a profile from a first electronic device to a second electronic device through a server, according to an embodiment of the present disclosure.

Referring to FIG. 4, a profile A 20 encrypted through the server 300 is transferred from the first electronic device 200 to the second electronic device 400. However, unlike the embodiment described with reference to FIG. 3, in FIG. 4 the server 300 does not regenerate the profile A 20. Instead in FIG. 4, the profile A 20 to be transferred from the first electronic device 200 to the second electronic device 400 is an encrypted profile installed on the first electronic device 200. When the first electronic device 200 and the second electronic device 400 are both connected to a network, such as a Wi-Fi or cellular network, the first electronic device 200 may transfer the encrypted profile A 20 to the server 300 and the second electronic device 400 may receive the encrypted profile A 20 from the server 300. For example, the first electronic device 200 may communicate with the server 300 through an operator network of MNO 1 using the profile A 20 installed on the secure memory 10 of the first electronic device 200, and the second electronic device 400 may communicate with the server 300 through an operator network of MNO 2 using a profile B 40 stored in the secure memory 10 or a removable memory (e.g., a SIM card, UICC, or the like) of the second electronic device 400.

The server 300 transmits an authentication result to the first electronic device 200 in response to an authentication request about the second electronic device 400 and may then receive an encrypted profile A 20 from the first electronic device 200. The server 300 transfers the encrypted profile A 20 to the second electronic device 400. The server 300 establishes a secure channel between the server 300 and the first electronic device 200 or between the server 300 and the second electronic device 400. The server 300 may use feature information associated with the first electronic device 200 or the second electronic device 400 to establish the secure channel.

The second electronic device 400 receives the encrypted profile A 20 from the u) server 300 through an operator network of the MNO 2 corresponding to the profile B 40 being currently used on the second electronic device 400 and stores the encrypted profile A 20 in a secure memory 10 of the second electronic device 400. The profile A 20 may be deleted at the first electronic device 200, and the encrypted profile A 20 transferred from the server 300 installed on the second electronic device 400. The methods of deleting the profile A 20 from the first electronic device 200 and installing the profile A in the second device 400 are the same as those described with reference to FIG. 2, and a description thereof is thus omitted.

If the profile A 20 is completely installed on the second electronic device 400, the second electronic device 400 may switch a currently used profile from the profile B 40 to the profile A 20.

Figure 5:
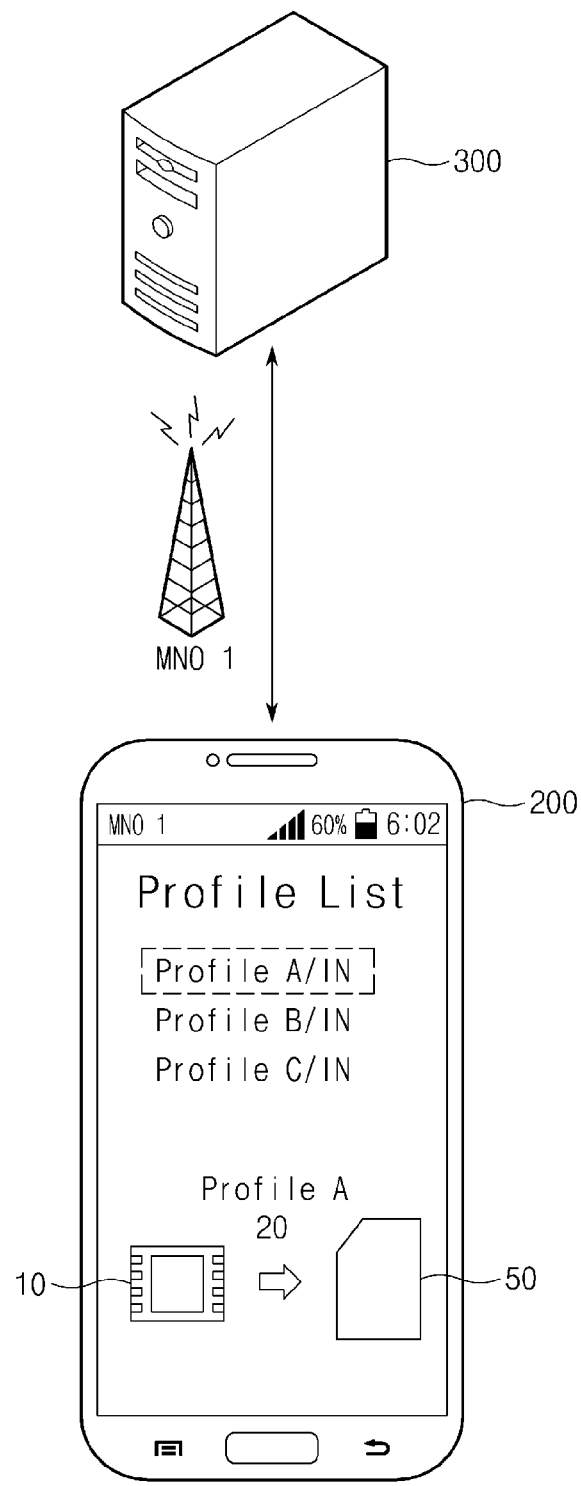
FIG. 5 illustrates a method for transferring a profile from a secure memory of a first electronic device to an external, removable security memory of the first electronic device, according to an embodiment of the present disclosure.

FIG. 5 illustrates a method for transferring a profile from a secure memory of a first electronic device to an external, removable security memory of the first electronic device, according to an embodiment of the present disclosure.

Referring to FIG. 5, a method of transferring a profile A 20 within a first electronic device 200 is provided. The first electronic device 200 includes both an internal secure memory 10 embedded therein and an external secure memory 50, which is removable, and transfers the profile A 20 installed on the internal secure memory 10 to the external secure memory 50 inserted therein. Alternatively, the first electronic device 200 may transfer the profile A 20, which is stored in the external secure memory 50 inserted therein, to the internal secure memory 10. For example, the external secure memory 50 may be a plug-in type smart card which downloads and installs a profile A 20 in the OTA manner or through a specific protocol. The external secure memory 50 may include a UICC, a removable secure element (SE), etc.

The first electronic device 200 may select a target profile, such as profile A 20, which is to be transferred between the internal secure memory 10 and the external secure memory 50. For example, a profile list may be displayed representing all profiles included in the internal secure memory 10 and/or the external secure memory 50 of the first electronic device 200 and one of the profiles in the list may be selected to be transferred. For example, as shown in FIG. 5, the first electronic device 200 includes three profiles: profile A, profile B, and profile C. For example, a profile included in the internal secure memory 10 may be marked with "IN", and a profile included in the external secure memory 50 may be marked with "EX". The profile A, the profile B, and the profile C, each marked with "IN", are installed on the internal secure memory 10 and no profile is installed on the external secure memory 50.

When the profile A 20 is transferred between the internal secure memory 10 and the external secure memory 50 in the first electronic device 200, the first electronic device 200 performs authentication about the internal secure memory 10 or the external secure memory 50 to which the profile A 20 is to be transferred, rather than device authentication. For example, in the case where the profile A 20 is transferred from the internal secure memory 10 to the external secure memory 50, the first electronic device 200 performs authentication about the external secure memory 50. In contrast, in the case where the profile A 20 is transferred to the internal secure memory 50 from the external secure memory 10, the first electronic device 200 performs authentication about the internal secure memory 10. Unlike the embodiments described with reference to FIGS. 2 to 4, in FIG. 5, the first electronic device 100 performs authentication using only identification information (e.g., EID (eUICC-ID)) of the internal secure memory 10 or the external secure memory 50, and not various device information (e.g., IMEI (international mobile equipment identity, EID (eUICC-ID), MSISDN (mobile station international subscriber directory number), etc.). The first electronic device 200 may perform authentication about the internal secure memory 10 or external secure memory 50 through the server 300 or using authentication policy information stored in the first electronic device 200. When authentication is completed, the first electronic device 200 transfers the profile A 20, installed on the internal secure memory 10, to the external secure memory 50. When the profile A 20 is transferred to the external secure memory 50 from the internal secure memory 10, the profile A 20 may be removed from the internal secure memory 10, as described with reference to FIG. 2.

According to an embodiment of the present disclosure, after the profile A 20 is transferred to the external secure memory 50, the external secure memory 50 may be detached from the first electronic device 200 and may be inserted into a second electronic device 400. Accordingly, by this method, when the second electronic device 400 does not include an internal secure memory, the profile A 20 installed on the internal secure memory 10 of the first electronic device 200 may be transferred to the second electronic device 400 using the external secure memory 50.

Figure 6:
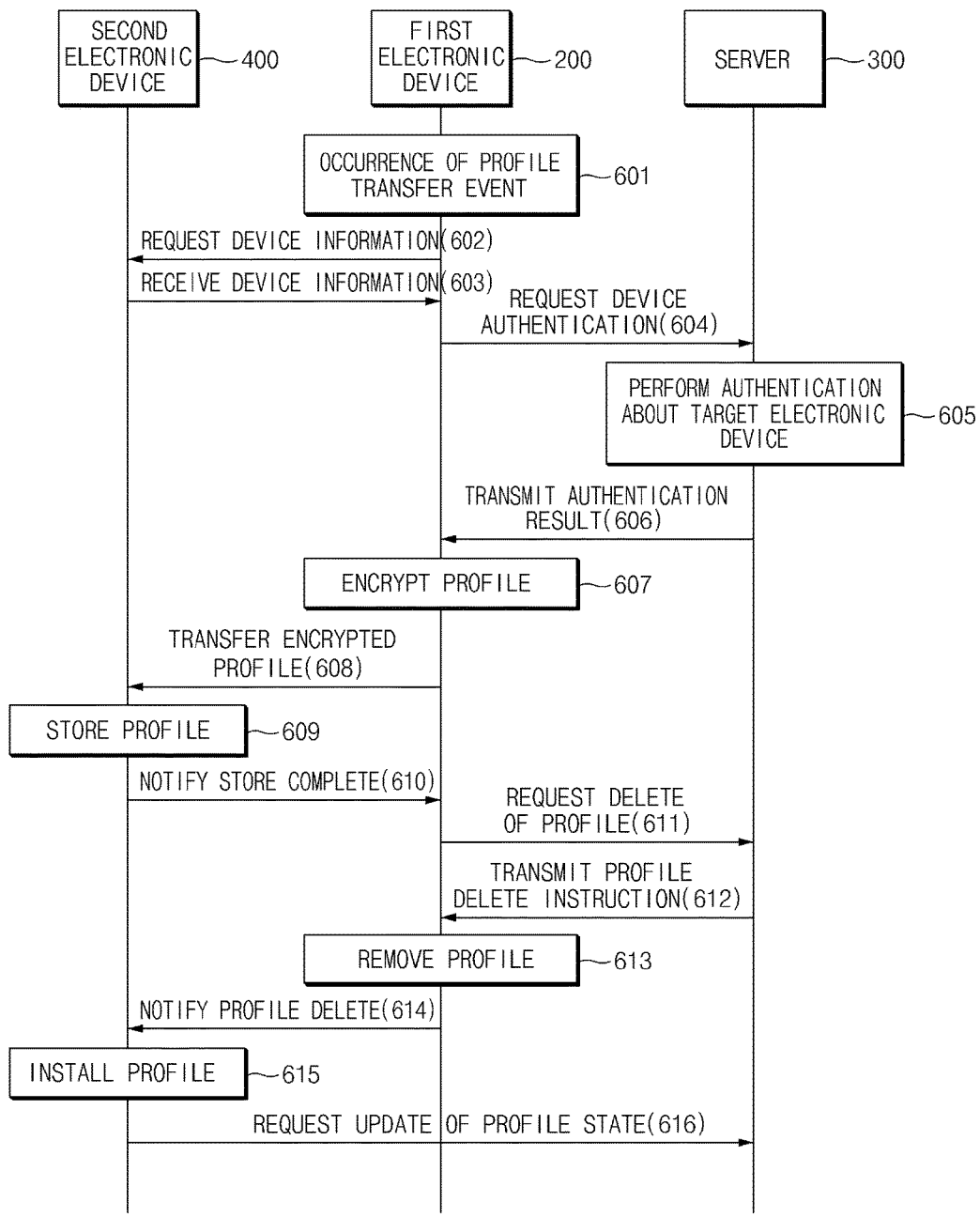
FIG. 6 is a signal flow diagram of a method for directly transferring a profile from a first electronic device to a second electronic device, according to an embodiment of the present disclosure.

FIG. 6 is a signal flow diagram of a method for directly transferring a profile from a first electronic device to a second electronic device, according to an embodiment of the present disclosure.

Referring to FIG. 6, a profile transfer method between a first electronic device 200 and a second electronic device 400 is provided.

In step 601, a profile transfer event about a profile A 20, i.e., a target profile, installed on a secure memory 10 of the first electronic device 200 occurs to transfer the profile A 20 from the first electronic device 200 to the second electronic device 400. In step 602, the first electronic device 200 requests device information from the second electronic device 400. For example, the first electronic device 200 may request device information using NFC. However, the scope and spirit of the present disclosure may not be limited thereto. For example, the first electronic device 200 may be able to use other forms of communication, such as Wi-Fi, BT, etc.

In step 603, the first electronic device 200 receives device information from the second electronic device 400. The device information may include a unique identifier, manufacturing information, feature information, etc. of the second electronic device 400.

In step 604, the first electronic device 200 transmits a request for device authentication from the server 300 together with the device information and profile information.

In step 605, the server 300 performs authentication about the second electronic device 400. For example, the server 300 authenticates whether to allow the transfer of the profile A 20 to the second electronic device 400.

In step 606, the server 300 transmits an authentication result to the first electronic device 200.

If the authentication about the target electronic device is allowed, then in step 607, the first electronic device 200 encrypts the profile A 20 to be transferred to second electronic device 40.

In step 608, the first electronic device 200 transfers the encrypted profile A 20 to the second electronic device 400.

In step 609, the second electronic device 400 stores the received encrypted profile A 20 in a secure memory 10 of the second electronic device 400.

When the received encrypted profile A 20 is completely stored, then in step 610, the second electronic device 400 informs the first electronic device 200 that the received encrypted profile A 20 is completely stored.

When the notification that the encrypted profile A 20 is completely stored in the second electronic device 400 is received, then in step 611, the first electronic device 200 transmits a profile transfer complete message or a profile delete request to the server 300.

In step 612, the server 300 transmits a profile delete instruction to the first electronic device 200.

In step 613, the electronic device 200 deletes the profile A 20 installed in the secure memory 10 in response to the profile delete instruction from the server 300.

When the profile A 20 is completely deleted, then in step 614, the first electronic device 200 notifies the second electronic device 400 that the profile is completely deleted.

In step 615, the second electronic device 400 decrypts the transferred encrypted profile A 20 and installs the decrypted profile A 20 stored in the secure memory 10 of the second electronic device 400.

In step 616, the second electronic device 400 requests an update about a profile state from the server 300. If the server 300 does not include a function of a profile manager server, the update about the profile state may be requested from the profile management server.

Figure 7:
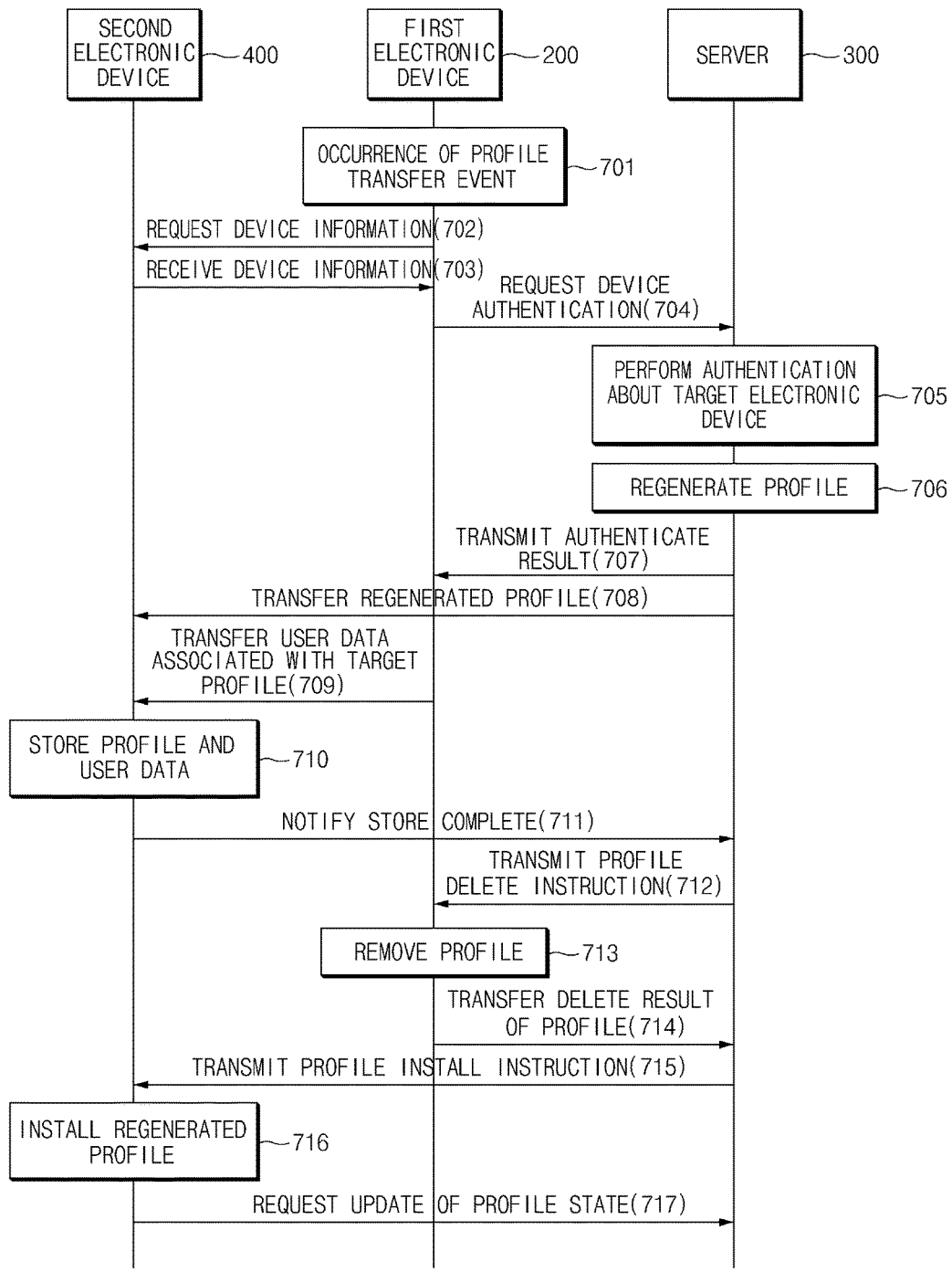
FIG. 7 is a signal flow diagram of a method for transferring a profile, regenerated by a server, from a first electronic device to a second electronic device, according to an embodiment of the present disclosure.

FIG. 7 is a signal flow diagram of a method for transferring a profile, regenerated by a server, from a first electronic device to a second electronic device, according to an embodiment of the present disclosure;

Referring to FIG. 7, a profile transfer method between a first electronic device 200 and a second electronic device 400 is provided.

Steps 701 to 705 correspond to steps 601 to 605 of FIG. 6, and a description thereof is thus omitted.

In step 706, the server 300 regenerates a profile A' 30 which includes user subscription information which is the same as that of a target profile A 20 stored on the first electronic device 200, based on received profile information about profile A 20.

In step 707, the server 300 transmits an authentication result to the first electronic device 200.

If the authentication about the target electronic device is allowed, then in step 708, the server 300 transfers the regenerated profile A' 30 to the second electronic device 400. The server 300 may encrypt the regenerated profile A' 30 and transfer the encrypted regenerated profile A' 30 to the second electronic device 400.

If the authentication about the target electronic device is allowed, then in step 709, the first electronic device 200 transfers user data associated with the target profile A 20 to the second electronic device 400.

In step 710, the second electronic device 400 stores the received encrypted regenerated profile A' 30 and the user data in a secure memory 10 of the second electronic device 400.

When the received encrypted regenerated profile A' 30 is completely stored, then in step 711, the second electronic device 400 informs the server 300 that the received encrypted regenerated profile A' 30 is completely stored.

In step 712, the server 300 transmits a delete instruction about the profile A 20 stored on the first electronic device 200, to the first electronic device 200.

Alternatively, the first electronic device 200 may delete the profile A 20, stored thereon, without intervention of the server 300 and may notify the server 300 of a profile delete result, instead of deleting the profile A 20 in response to the delete instruction from the server 300. In this case, the second electronic device 400 notifies the first electronic device 200 that the encrypted regenerated profile A' 30 is completely stored. The first electronic device 200 informs the server 300 of a profile delete result after deleting the profile A 20 from the first electronic device 200 in response to the notification from the second electronic device 400 indicating that the encrypted regenerated profile A' 30 is completely stored.

In step 713, the first electronic device 200 deletes the profile A 20 installed in the secure memory 10.

When the profile A 20 is completely deleted, then in step 714, the first electronic device 200 transmits a profile delete result (e.g., that the profile A 20 is completely deleted) to the server 300.

In step 715, the server 300 transmits an install instruction about the encrypted regenerated profile A' 30 to the second electronic device 400. Data or a message may be transmitted from the server 300 to the second electronic device 400 through a communication network of the first electronic device 200.

In step 716, the second electronic device 400 decrypts the encrypted regenerated profile A' 30 and installs the decrypted regenerated profile A' 30 stored in the secure memory 10 of the second electronic device 400.

In step 717, the second electronic device 400 requests an update about a profile state from the server 300. As described with reference to FIG. 5, an update request about a profile state may be transferred to a profile manager server.

Figure 8:
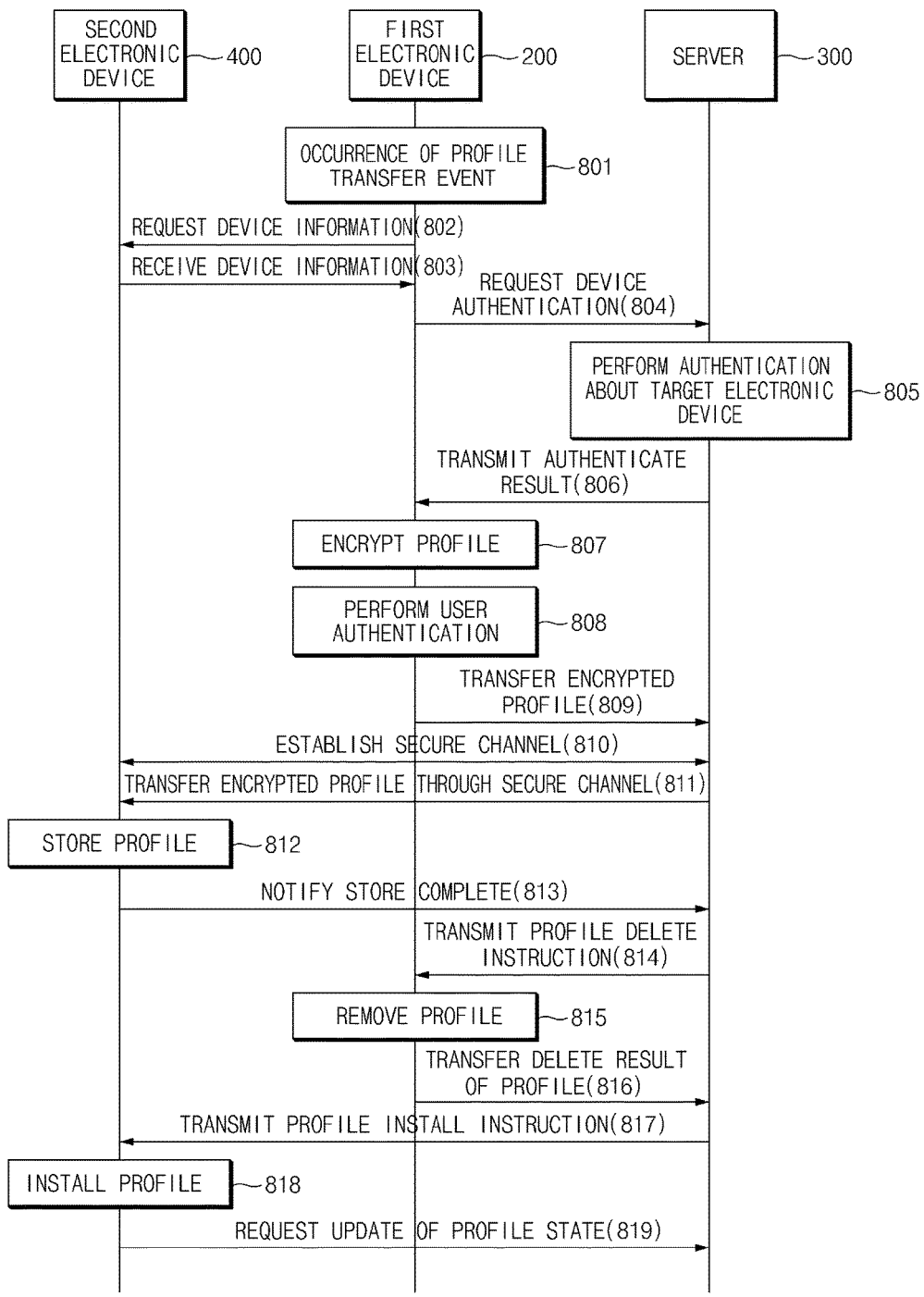
FIG. 8 is a signal flow diagram of a method for transferring a profile from a first electronic device to a second electronic device through a server, according to an embodiment of the present disclosure.

FIG. 8 is a signal flow diagram of a method for transferring a profile from a first electronic device to a second electronic device through a server, according to an embodiment of the present disclosure.

Referring to FIG. 8, a profile transfer method between a first electronic device 200 and a second electronic device 400 is provided.

Steps 801 to 807 correspond to steps 601 to 607 of FIG. 6, and a description thereof is thus omitted.

In step 808, the first electronic device 200 performs user authentication to transfer an encrypted profile A 20.

In step 809, the first electronic device 200 transfers an encrypted profile A 20 to the server 300.

In step 810, the second electronic device 400 establishes a secure channel for transferring the encrypted profile A 20 between the second electronic device 400 and the server 300.

In step 811, the server 300 transfers the encrypted profile A 20, received from the first electronic device 200, to the second electronic device 400 through the secure channel.

In step 812, the second electronic device 400 stores the received encrypted profile A 20 in a secure memory 10 of the second electronic device 400.

When the received encrypted profile A 20 is completely stored, then in step 813, the second electronic device 400 informs the server 300 that the received encrypted profile A 20 is completely stored.

In step 814, the server 300 transmits a delete instruction about an installed encrypted profile A 20 to the first electronic device 200.

In step 815, the first electronic device 200 deletes the encrypted profile A 20 installed on the secure memory 10 of the first electronic device 200.

When the encrypted profile A 20 is completely deleted, then in step 816, the first electronic device 200 notifies the server 300 that the encrypted profile A 20 is completely deleted.

In step 817, the server 300 transmits an install instruction about the encrypted profile A 20 to the second electronic device 400.

In step 818, the second electronic device 400 decrypts the transferred encrypted profile A 20 and installs the decrypted profile A 20 stored in the secure memory 10 of the second electronic device 400.

In step 819, the second electronic device 400 requests an update about a profile state from the server 300.

FIGS. 9A to 9E illustrate screens of a first electronic device for generating a profile transfer event in which the first electronic device transfers a profile to a second electronic device, according to an embodiment of the present disclosure.

Referring to FIGS. 9A to 9E, a first electronic device 200 is provided. The profile manager module 170 of the first electronic device 200 determines whether a profile transfer event about a profile A 20, installed in the secure memory 10, occurs. For example, the profile transfer event may occur by a user input through a user interface screen of the first electronic device 200. Alternatively, the profile transfer event may occur by a remotely received input. For example, a user may connect to a web server and generate the profile transfer event for transferring the profile A 20 installed on the first electronic device 200 to a second electronic device 400 (i.e., a target electronic device). For example, the user may remotely connect to the first electronic device 200 through the web server to generate the profile transfer event or may generate the profile transfer event through a web server connected with a profile transfer server 300 (or a profile authentication server).

Figure 9A:
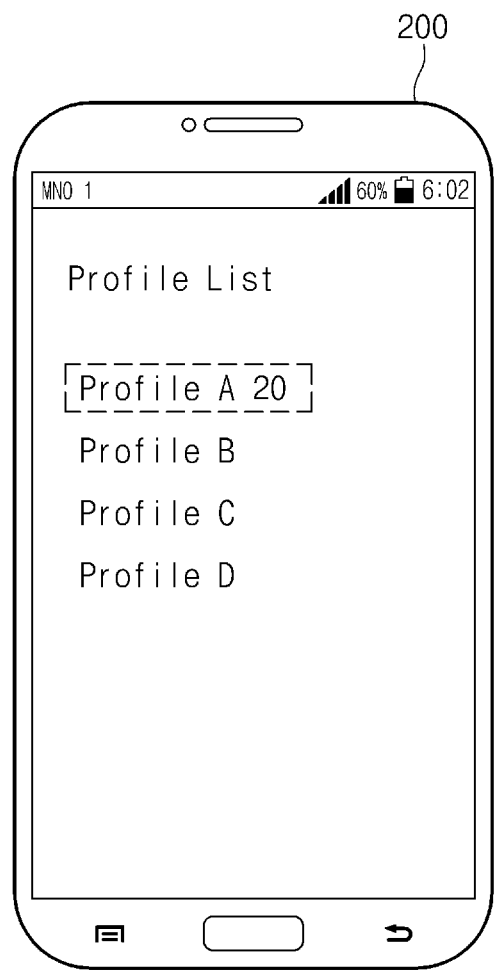
FIGS. 9A to 9E illustrate screens of a first electronic device for generating a profile transfer event in which the first electronic device transfers a profile to a second electronic device, according to an embodiment of the present disclosure.

Referring to FIG. 9A, when the profile transfer event occurs the profile manager module 170 displays, through the display 150, on a screen of the electronic device 200, at least one profile currently installed on the secure memory 10 of the electronic device 200.

According to an embodiment of the present disclosure, the profile manager module 170 displays the screen including a list of profiles capable of being transferred to the second electronic device 400 based on profile information of each profile. For example, the profile manager module 170 may not display a profile which is prohibited from being transferred by a network, upon generation of the profile, or which is prohibited from being transferred through a user setting.

Alternatively, all profiles available on the first electronic device 200 may be displayed through a profile list screen, and a profile unable to be transferred (e.g., such as a profile prohibited from being transferred) may be identified on the list screen as being unable to be transferred.

The profile manager module 170 receives an input for selecting one of the displayed profiles, which is to be transferred to any other electronic device, from among at least one profile installed on the secure memory 10 and at least one profile available for a profile transfer.

For example, as shown in FIG. 9A, the profile manager module 170 receives a user input for selecting profile A 20, which is to be transferred to the second electronic device 400, from among profiles in the list displayed on a screen. Alternatively, the profile manager module 170 receives an input for selecting a profile to be transferred to the second electronic device 400 remotely through a web server.

When the profile A 20 to be transferred is selected, the profile manager module 170 provides information for transferring the selected profile A 20.

Figure 9B:
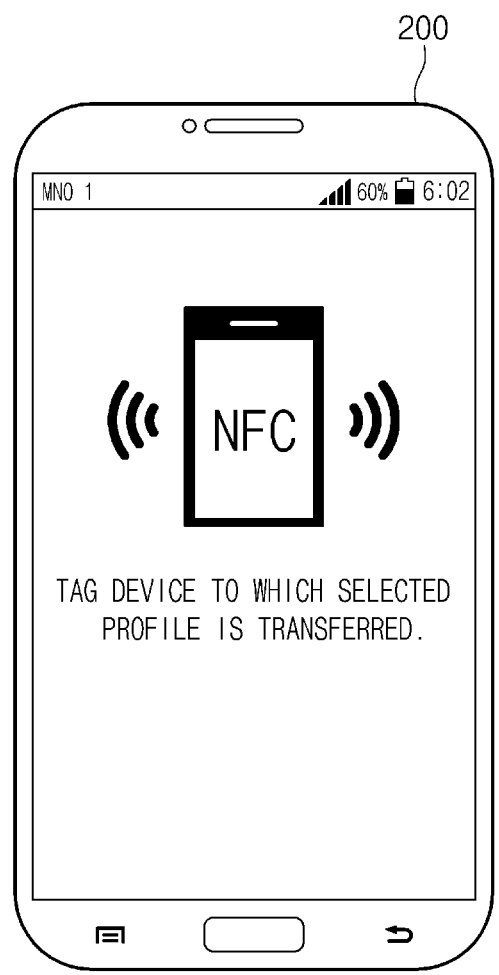

Referring to FIG. 9B, according to an embodiment of the present disclosure, the profile manager module 170 provides information needed to establish a communication channel with the second electronic device 400, through a user interface. For example, the profile manager module 170 may request NFC tagging with the second electronic device 400 to transfer the selected profile A 20. Alternatively, the profile manager module 170 provides a QR code, a bar code, etc. associated with the selected profile A 20 and requests the second electronic device 400 to recognize a corresponding code. If a communication channel is established between the first electronic device 200 and second electronic device 400, the profile manager module 170 receives information for device authentication (e.g., device information of the second electronic device 400, authentication-associated information (e.g., a certificate) of the second electronic device 400, etc.) from the second electronic device 400 through the communication channel.

According to an embodiment of the present disclosure, the profile manager module 170 receives information (e.g., a secure channel protocol, an encryption algorithm, etc.) for establishing a secure channel with the second electronic device 400 from the second electronic device 400 through the communication channel.

According to an embodiment of the present disclosure, the profile manager module 170 provides information (e.g., activation code information), which allows the second electronic device 400 to receive the target profile A 20 through the server 300, with the form of the QR code, the bar code, etc. At this time, the activation code may be information used for the profile provisioning at the first electronic device 200, the second electronic device 400, or the server 300, and may be provided to a service contract document between a service provider and a user in the form of the QR code or in an independent form (e.g., a scratch card). The profile manager module 170 may recognize the activation code at the first electronic device 200 and store the activation code in the form of digital information. For example, when the profile manager module 170 of the first electronic device 200 provides the digitized activation code in the form of the QR code, the bar code, etc., the second electronic device 400 may recognize the digitized activation code and downloads a target profile associated with the digitized activation code through the server 300. In the case where the second electronic device 400 downloads the profile A 20 using the activation code, the second electronic device 400 may associate and store the downloaded profile A 20 and corresponding activation code information. Alternatively, in the case where the second electronic device 400 is provided with the activation code from the first electronic device 200 (e.g., through a QR code recognition, NFC tagging, etc.) or in the case where a profile A 20 associated with the activation code transferred to the second electronic device 400 previously exists, the second electronic device 400 may associate and store the transferred activation code and a corresponding profile A 20. Alternatively, in the case where a previously stored profile A 20 is transferred from the first electronic device 200 to the second electronic device 400, activation code information associated with a corresponding profile A 20 may be provided to a user in the form of a QR code, an NFC code, a bar code, etc.

According to an embodiment of the present disclosure, the second electronic device 400 to which a profile is to be transferred may be designated in advance or upon occurrence of the profile transfer event. For example, the profile manager module 170 may previously designate the second electronic device 400 related to a corresponding profile A 20 upon generation of a profile A 20. Alternatively, the profile manager module 170 may designate the second electronic device 400 about a corresponding profile A 20, previously installed in the secure memory 10 of the second electronic device 400, in the OTA manner. In the case where the second electronic device 400 is designated upon occurrence of the profile transfer event, as with the selection of a profile A 20, the profile manager module 170 may receive a user input for designating the second electronic device 400 through a user interface screen or may receive an input for designating the second electronic device 400 remotely.

The profile manager module 170 performs the authentication procedure if the target profile A 20 and the second electronic device 400 are designated. If authentication about the second electronic device 400 is allowed, the profile manager module 170 performs user authentication about a transfer of the target profile A 20 finally before the target profile A 20 is transferred to the second electronic device 400.

Figure 9C:
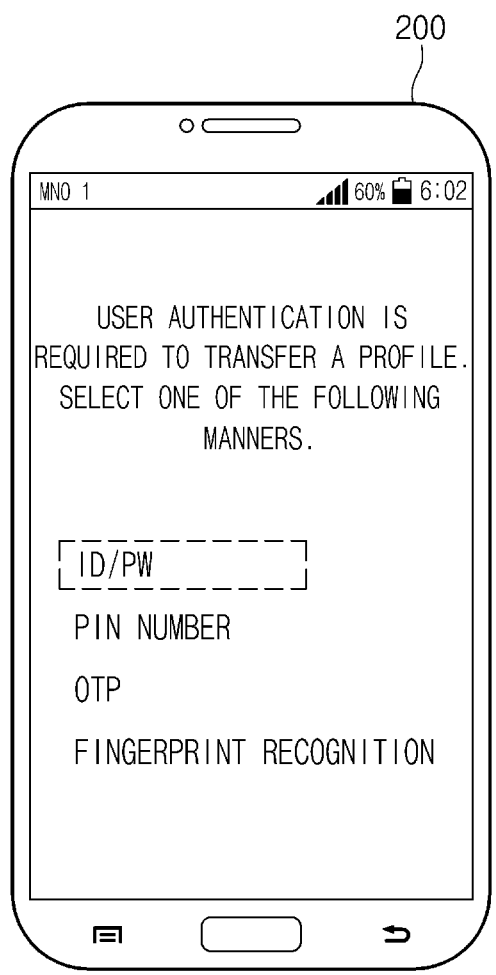

Referring to FIG. 9C, the profile manager module 170 requests a selection about a desired user authentication method. For example, the user authentication method may include ID/PW, PIN code input, one time password (OTP), biometrics (e.g., face recognition, fingerprint recognition, iris recognition, and the like), pattern input, etc.

Figure 9D:
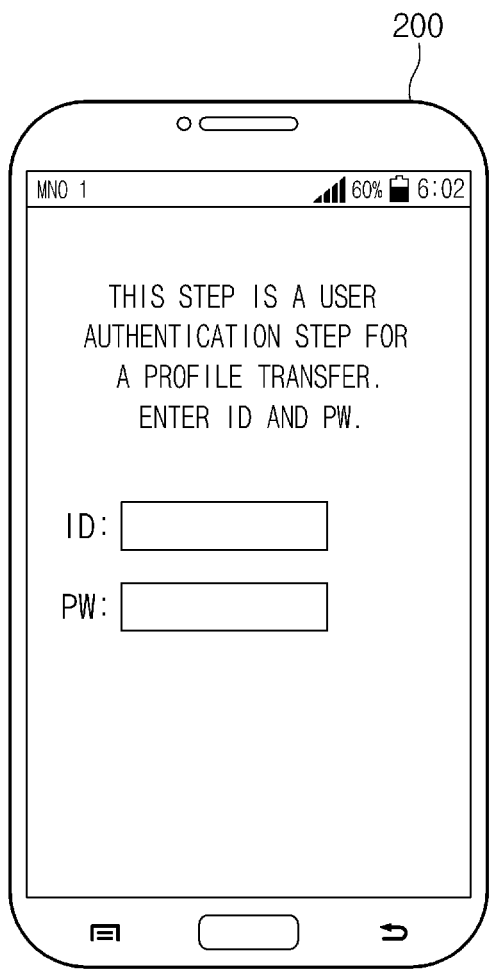

Referring to FIG. 9D, when the user authentication method is selected, user authentication may be required in the selected method. The user authentication may be made only at the first electronic device 200 which transfers the profile A 20 or may be made both at the first electronic device 200, which transfers the profile A 20, and at the second electronic device 400, which receives the profile A 20. For example, if an ID/PW authentication method is selected, the first electronic device 200 and/or the second electronic device 400 may require user authentication through an ID and PW input.

According to an embodiment of the present disclosure, in the case where the user authentication is made both at the first electronic device 200 and at the second electronic device 400, an authentication method which is selected at one of the first electronic device 200 and the second electronic device 400 may be applied to both the first electronic device 200 and the second electronic device 400. For example, in the case where fingerprint recognition is selected as a user authentication method at the first electronic device 200 transferring the profile A 20, the user authentication may be made using fingerprint recognition at the second electronic device 400 as well.

According to an embodiment of the present disclosure, in the case where the user authentication is made both at the first electronic device 200 and at the second electronic device 400, the user authentication may be made using the OTP method, for example, a method in which the same password is inputted to both the first electronic device 200 and the second electronic device 400.

Figure 9E:
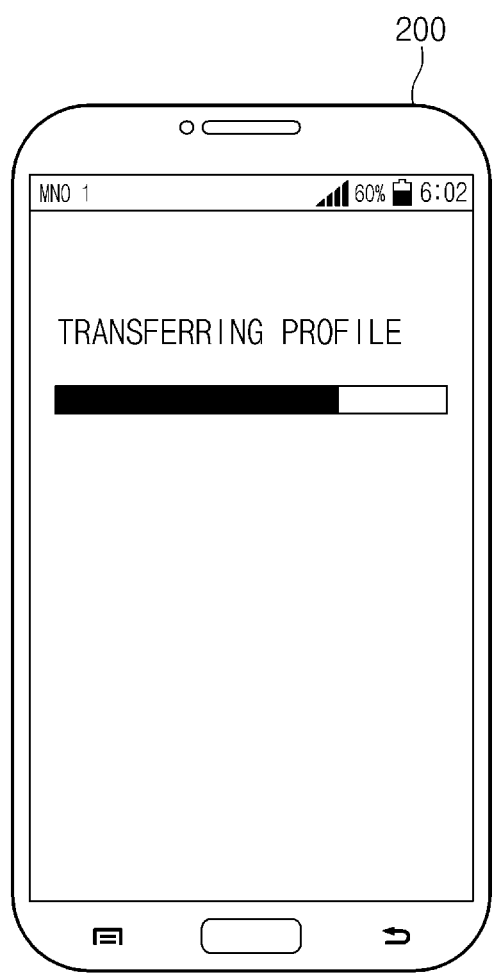

Referring to FIG. 9E, when the user authentication is completed the profile A 20 is transferred from the first electronic device 200 to the second electronic device 400.

Figure 10:
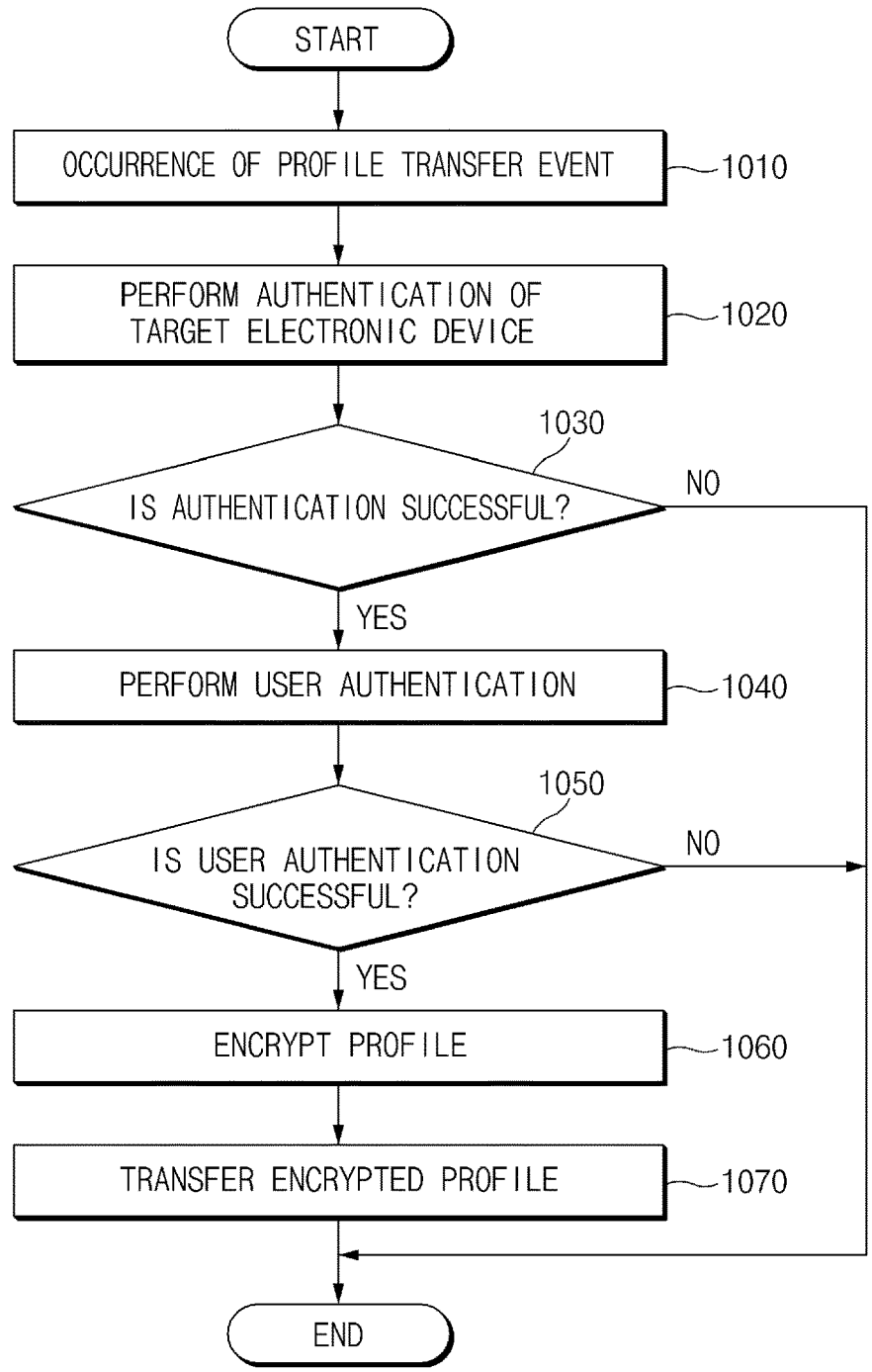
FIG. 10 is a flowchart of a method for transferring a target profile from a first electronic device to a second electronic device, according to an embodiment of the present disclosure.

FIG. 10 is a flowchart of a method for transferring a target profile from a first electronic device to a second electronic device, according to an embodiment of the present disclosure.

Referring to FIG. 10, a profile transfer method of first electronic device 200 is provided. The first electronic device 200 may be the same as the electronic device 101 shown in FIG. 1.

In step 1010, the profile manager module 170 of a first electronic device 200 detects an occurrence of a profile transfer event.

In step 1020, the profile manager module 170 performs authentication about a second electronic device 400 (i.e., a target electronic device).

In step 1030, the profile manager module 170 determines whether the authentication is successful. If the authentication is successful, the profile manager module 170 performs step 1040; otherwise, the profile transfer process ends.

In step 1040, the profile manager module 170 performs user authentication. For example, the user authentication may be made according to a method selected by a user.

In step 1050, the profile manager module 170 determines whether the user authentication is successful. If the user authentication is successful, the profile manager module 170 performs step 1060; otherwise, the profile transfer process ends.

In step 1060, the profile manager module 170 encrypts a profile A 20 to be transferred.

In step 1070, the profile manager module 170 transfers the encrypted profile A 20 to the second electronic device 400. According to an embodiment, the profile manager module 170 establishes a secure channel for transferring the profile A 20 between the first electronic device 200 and the second electronic device 400 and transfers the encrypted profile A 20 through the secure channel. Alternatively, the profile manager module 170 transfers the encrypted profile through a server 300.

Figure 11:
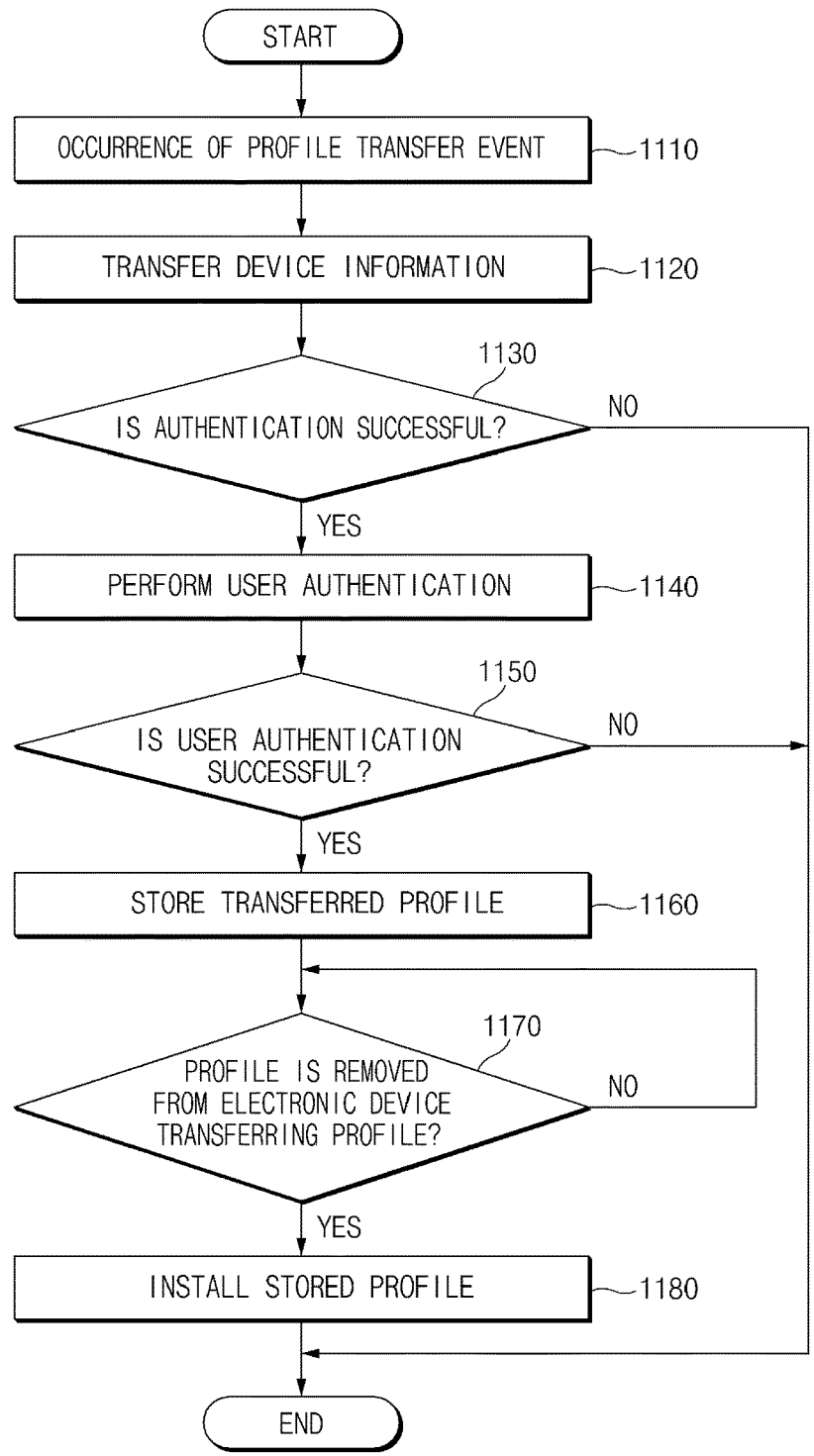
FIG. 11 is a flowchart of a method for receiving a target profile transferred from a first electronic device at a second electronic device, according to an embodiment of the present disclosure.

FIG. 11 is a flowchart of a method for receiving a target profile transferred from a first electronic device at a second electronic device, according to an embodiment of the present disclosure.

Referring to FIG. 11, a profile receiving method of a second electronic device 400 (i.e., a target electronic device) is provided. The second electronic device 400 may be the same as the electronic device 101 shown in FIG. 1.

In step 1110, the profile manager module 170 of the second electronic device 400 detects an occurrence of a profile transfer event. For example, the second electronic device 400 determines whether the profile transfer event occurs, based on a request about device information from a first electronic device 200 transferring a profile A 20 to the second electronic device 400.

In step 1120, the second electronic device 400 transfers device information of the second electronic device 400 to the first electronic device 200 transferring a profile A 20 for authentication of the second electronic device 400.

In step 1130, the second electronic device 400 determines whether the authentication of the second electronic device 400 is successful. If the authentication is successful, the profile manager module 170 performs step 1140; otherwise, the profile receiving process ends.

In step 1140, the second electronic device 400 performs user authentication. For example, the user authentication at the second electronic device 400 may be performed in the same manner as that performed at the first electronic device 200 transferring a profile A 20.

In step 1150, the second electronic device 400 determines whether the user authentication is successful. If the user authentication is successful, the second electronic device 400 performs step 1160; otherwise, the profile receiving process ends.

In step 1160, the second electronic device 400 stores the profile A 20 transferred from the first electronic device 200.

In step 1170, the second electronic device 400 determines whether the profile A 20 is deleted from the first electronic device 200 transferring a profile. If the profile A 20 is deleted, the second electronic device 400 performs step 1180; otherwise, the procedure repeats step 1170.

In step 1180, the second electronic device 400 installs the stored profile A 20.

According to various embodiments of the present disclosure, it may be possible to prevent illegal copying (cloning) or use of a profile upon transferring the profile, and to improve user convenience in profile transferring.

The term "module" used herein may represent, for example, a unit including one or more combinations of hardware, software and firmware. The term "module" may be interchangeably used with terms such as "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" includes at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations), according to an embodiment of the present disclosure, may be implemented by instructions stored in a computer-readable storage media in the form of a program module.

For example, a recording medium may be provided which stores instructions causing a computer (or a processor) to perform the profile transfer method described above with reference to certain embodiments of the present disclosure.

A module or a program module, according to an embodiment of the present disclosure, may include at least one of the above elements, or a portion of the above elements may be omitted, or additional other elements may be further included. Operations performed by a module, a program module, or other elements may be executed sequentially, in parallel, repeatedly, or in a heuristic method. Also, a portion of operations may be executed in different sequences, omitted, or other operations may be added.

While the present disclosure has been shown and described with reference to an embodiment thereof, it should be understood by those skilled in the art that various changes in form and details may be made therein without departing from the spirit and scope of the present disclosure. Therefore, the scope of the present disclosure is defined not by the detailed description of the present disclosure, but by the appended claims and their equivalents.

What is claimed is:

1. A method for transferring a profile of a first electronic device, the method comprising:
   detecting an occurrence of a profile transfer event on a target profile from among at least one profile stored in a first secure memory of the first electronic device;
   requesting, to a second electronic device through a near field communication (NFC) protocol, device information of the second electronic device;
   receiving, from the second electronic device through the NFC protocol, the device information of the second electronic device and feature information comprising a protocol regarding a secure channel;
   transmitting, to a server through a cellular communication protocol, a request for authentication of the second electronic device together with the device information of the second electronic device;
   receiving, from the server through the cellular communication protocol, a result of the authentication of the second electronic device based on the device information;
   in response to receiving the result of the authentication, establishing, by using the protocol, the secure channel wirelessly established between the first secure memory and a second secure memory included in the second electronic device; and
   transmitting, to the second electronic device, the target profile via the secure channel.

2. The method of claim 1, further comprising:
   encrypting the target profile based on the result of the authentication of the second electronic device,
   wherein transmitting the target profile comprises transmitting the encrypted target profile.

3. The method of claim 1, further comprising:
   transferring user data associated with the target profile together with the target profile.

4. The method of claim 1,
   wherein the device information comprises at least one of an identifier of a target electronic device, a certificate of the target electronic device, or model name of the target electronic device.

5. An electronic device, comprising:
   a first secure memory storing at least one profile;
   a communication interface configured to communicate with a server and/or a target electronic device;
   at least one processor operatively coupled to the first secure memory and the communication interface; and
   a memory operatively coupled to the at least one processor, storing instructions which cause the at least one processor to:
   detect an occurrence of a profile transfer event on a target profile from among the at least one profile stored in the first secure memory;
   control the communication interface to send a request, to the target electronic device through a near field communication (NFC) protocol, device information of the target electronic device;
   control the communication interface to receive, from the target electronic device through the NFC protocol, the device information of the target electronic device and feature information comprising a protocol regarding a secure channel;
   control the communication interface to transmit, to the server through a cellular communication protocol, a request for authentication of the target electronic device together with the device information;
   control the communication interface to receive, from the server through the cellular communication protocol, a result of the authentication of the target electronic device based on the device information;
   in response to receiving the result of the authentication, control the communication interface to establish, by using the protocol, the secure channel wirelessly established between the first secure memory and a second secure memory included in the target electronic device; and control the communication interface to transmit, to the target electronic device, the target profile via the secure channel.

6. The electronic device of claim 5, wherein the instructions cause the at least one processor to:

encrypt the target profile based on the result of the authentication, and control the communication interface to transfer the encrypted target profile to the target electronic device.

7. The electronic device of claim 5, wherein the instructions cause the at least one processor to perform an authentication procedure based on whether the target electronic device corresponds to a previously authenticated electronic device.

8. The electronic device of claim 5, wherein the instructions cause the at least one processor to perform user authentication before transferring the target profile to the target electronic device.

9. The electronic device of claim 5, wherein the instructions cause the at least one processor to control the communication interface to transfer user data associated with the target profile together with the target profile.

10. The electronic device of claim 5, wherein the device information comprises at least one of an identifier of the target electronic device, a certificate of the target electronic device, or model name of the target electronic device.

* * * * *